(12) United States Patent
Chai et al.

(10) Patent No.: US 7,107,838 B2
(45) Date of Patent: Sep. 19, 2006

(54) APPARATUS AND METHODS FOR MONITORING WATER CONSUMPTION AND FILTER USAGE

(75) Inventors: John Y. Chai, Hong Kong (HK); Sunny N. Chai, Hong Kong (HK); Derek C. Ko, Hong Kong (HK)

(73) Assignee: Fook Tin Technologies Ltd., Hong Kong (HK)

( * ) Notice: Subject to any disclaimer, the term of this patent is extended or adjusted under 35 U.S.C. 154(b) by 0 days.

(21) Appl. No.: 10/828,484

(22) Filed: Apr. 19, 2004

(65) Prior Publication Data

US 2005/0229699 A1   Oct. 20, 2005

(51) Int. Cl.
*G01F 23/26* (2006.01)
*G01F 23/00* (2006.01)
*G01F 23/24* (2006.01)

(52) U.S. Cl. .................. 73/304 R; 73/304 C; 73/290 R

(58) Field of Classification Search .............. 73/304 C, 73/290 R, 304 R, 861, 861.08, 861.78, 861.79
See application file for complete search history.

(56) References Cited

U.S. PATENT DOCUMENTS

| | | | | |
|---|---|---|---|---|
| 1,831,076 A | * | 11/1931 | Neeley | 204/276 |
| 2,213,961 A | * | 9/1940 | Hunter, Jr. | 137/392 |
| 3,038,610 A | | 6/1962 | Hetherington | |
| 3,339,578 A | * | 9/1967 | Smith | 307/118 |
| 3,347,786 A | * | 10/1967 | Erhardt et al. | 210/711 |
| 3,479,281 A | * | 11/1969 | Burgaud et al. | 210/703 |
| 3,503,507 A | | 3/1970 | Raupp et al. | |
| 3,586,018 A | | 6/1971 | Bogardh et al. | |
| RE27,829 E | * | 12/1973 | Tiffany | 307/118 |
| 3,861,565 A | | 1/1975 | Rickmeier, Jr. | |
| 4,010,650 A | * | 3/1977 | Piatkowski, Jr. | 73/304 C |
| 4,302,337 A | | 11/1981 | Larson et al. | |
| 4,436,223 A | * | 3/1984 | Wilson | 222/36 |
| 4,588,500 A | | 5/1986 | Sprenger et al. | |
| 4,590,575 A | * | 5/1986 | Emplit | 702/52 |

(Continued)

FOREIGN PATENT DOCUMENTS

DE    4026634 A1    2/1992

(Continued)

OTHER PUBLICATIONS

Schwarz et al., "Electrical Engineering: An Introduction," second edition, Oxford University Press, New York, 1993, cover page, copyright page, pp. 45-51, 64-67, 146-152, 184-188.

*Primary Examiner*—Hezron Williams
*Assistant Examiner*—Rodney Frank
(74) *Attorney, Agent, or Firm*—Jenner & Block LLP

(57) ABSTRACT

Apparatus and methods for employing electrical properties of water to indicate the level of filtered water in a filtered water container. The container is fitted with a hopper that holds unfiltered water. The hopper is fitted at its base with a removable and replaceable filter cartridge. Water is filtered by draining through the filter medium contained in the filter cartridge into the lower portion of the container. The water level in the lower portion of the container is monitored by means of one or more water level detector strips in the lower portion of the container. The detector strips are in electrical communication with a detection circuit and a control unit. The control unit uses the detection strips to monitor water level and uses such data to track filtered water consumption and to determine when the filter cartridge should be replaced.

44 Claims, 11 Drawing Sheets

U.S. PATENT DOCUMENTS

| | | | | |
|---|---|---|---|---|
| 4,623,457 A | * | 11/1986 | Hankammer | 210/237 |
| 4,681,677 A | | 7/1987 | Kuh et al. | |
| 4,769,135 A | | 9/1988 | Norton | |
| 4,772,386 A | | 9/1988 | Grout et al. | |
| 4,895,648 A | | 1/1990 | Hankammer | |
| 4,986,901 A | | 1/1991 | Nohren, Jr. et al. | |
| 4,998,228 A | | 3/1991 | Eger et al. | |
| 5,190,643 A | * | 3/1993 | Duncan et al. | 210/85 |
| 5,296,148 A | * | 3/1994 | Colangelo et al. | 210/642 |
| 5,328,597 A | * | 7/1994 | Boldt et al. | 210/87 |
| 5,457,665 A | | 10/1995 | Reid | |
| 5,536,394 A | * | 7/1996 | Lund et al. | 210/87 |
| 5,560,393 A | | 10/1996 | Clack | |
| 5,637,214 A | * | 6/1997 | Kahana | 210/282 |
| 5,649,471 A | | 7/1997 | Heynderickx et al. | |
| 5,665,224 A | | 9/1997 | Levene et al. | |
| 5,785,844 A | * | 7/1998 | Lund et al. | 210/85 |
| 5,830,360 A | | 11/1998 | Mozayeni | |
| 5,873,995 A | | 2/1999 | Huang et al. | |
| 5,882,507 A | * | 3/1999 | Tanner et al. | 210/85 |
| 5,900,138 A | | 5/1999 | Moretto | |
| 5,900,143 A | | 5/1999 | Dalton et al. | |
| 5,928,503 A | * | 7/1999 | Shang-Chun | 210/86 |
| 6,024,867 A | | 2/2000 | Parise | |
| 6,033,557 A | | 3/2000 | Gebhard et al. | |
| 6,074,550 A | | 6/2000 | Hofmann et al. | |
| 6,101,873 A | * | 8/2000 | Kawakatsu et al. | 73/304 C |
| 6,103,114 A | * | 8/2000 | Tanner et al. | 210/232 |
| 6,146,524 A | * | 11/2000 | Story | 210/199 |
| 6,214,239 B1 | * | 4/2001 | Renau | 210/739 |
| 6,224,751 B1 | * | 5/2001 | Hofmann et al. | 210/85 |
| 6,287,456 B1 | * | 9/2001 | Fish et al. | 210/85 |
| 6,296,756 B1 | * | 10/2001 | Hough et al. | 205/744 |
| 6,423,224 B1 | * | 7/2002 | Tanner et al. | 210/247 |
| 6,539,797 B1 | * | 4/2003 | Livingston et al. | 73/304 C |
| 6,636,151 B1 | * | 10/2003 | Busick | 340/521 |
| 6,651,824 B1 | * | 11/2003 | Miller | 210/464 |
| 6,881,327 B1 | * | 4/2005 | Tanner et al. | 210/85 |
| 6,926,821 B1 | * | 8/2005 | Giordano et al. | 210/87 |
| 6,953,523 B1 | * | 10/2005 | Vandenbelt et al. | 210/85 |
| 2002/0046957 A1 | * | 4/2002 | Hough et al. | 205/744 |
| 2002/0101346 A1 | * | 8/2002 | Busick | 340/521 |
| 2003/0159506 A1 | * | 8/2003 | Brutschin et al. | 73/290 V |
| 2004/0084382 A1 | * | 5/2004 | Ryazanova et al. | 210/748 |
| 2004/0149032 A1 | * | 8/2004 | Sell | 73/304 C |
| 2004/0168957 A1 | * | 9/2004 | Tsataros et al. | 210/85 |
| 2004/0245184 A1 | * | 12/2004 | Umezawa et al. | 210/748 |
| 2005/0022595 A1 | * | 2/2005 | Eguchi et al. | 73/304 R |

FOREIGN PATENT DOCUMENTS

| | | |
|---|---|---|
| DE | 4200253 A1 | 7/1993 |
| EP | 0861809 A1 | 9/1998 |
| EP | 1195 357 A1 | 4/2002 |
| FR | 262045 | 6/1926 |
| GB | 2008540 A | 6/1979 |
| GB | 2067888 A | 8/1981 |
| GB | 2252514 A | 8/1992 |
| GB | 2271106 A | 4/1994 |
| GB | 2358789 A | 8/2001 |
| GB | 2387229 A | 10/2003 |
| WO | WO 95/04705 | 2/1995 |
| WO | WO 95/29131 | 11/1995 |
| WO | WO 96/13318 | 5/1996 |
| WO | WO 96/21621 | 7/1996 |
| WO | WO 98/05401 | 2/1998 |
| WO | WO 98/17582 | 4/1998 |
| WO | WO 98/30139 | 7/1998 |
| WO | WO 98/32705 | 7/1998 |
| WO | WO 00/66245 | 11/2000 |
| WO | WO 03/028848 A1 | 4/2003 |

* cited by examiner

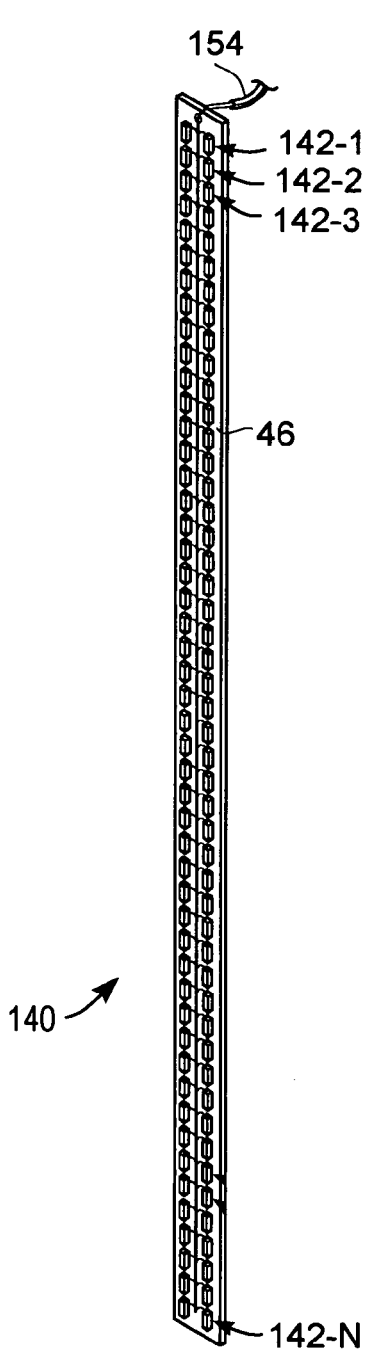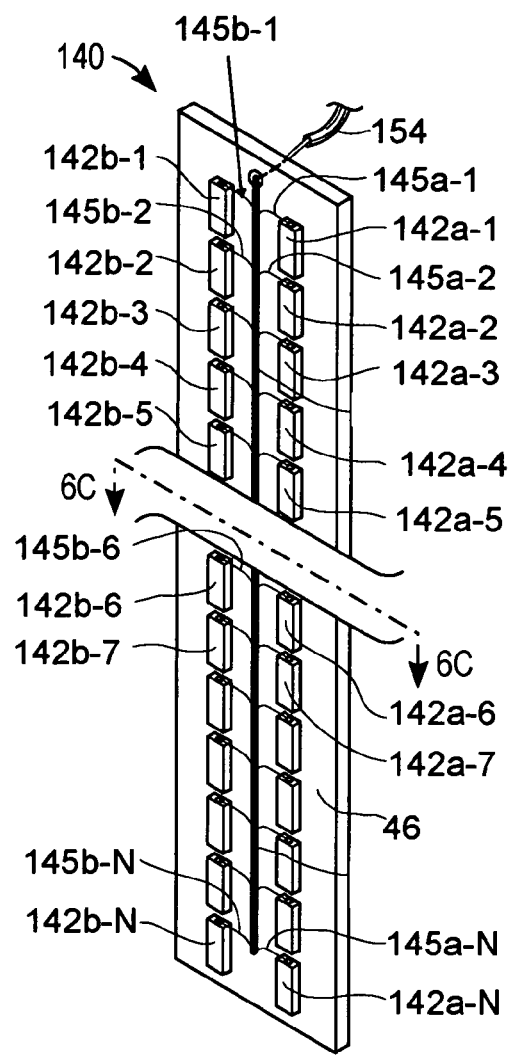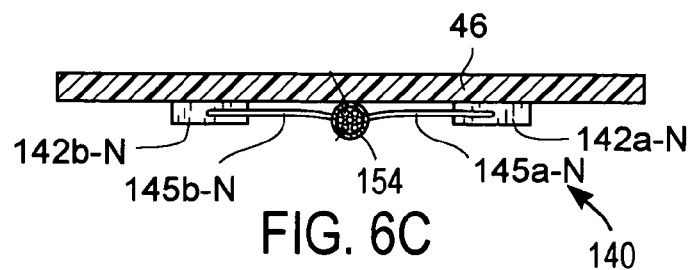
FIG. 6A
FIG. 6B
FIG. 6C

|  | 142 | 80 | 142a | 142b | 142c |
|---|---|---|---|---|---|
| Time | Water Level | Switch | Microprocessor | (a) | (b) | (c) |
| t0 | Low | Open | Off | 0 | 1 | 1 |
| ⋮ | | | | | | |
| t1 | Low | Open | Off | 0 | 1 | 1 |
| ⋮ | | | | | | |
| t2 | High | Closed | On | 0 | 0 | 1 |
| t3 | High | Closed | On | 1 | 0 | 0 |
| t4 | High | Closed | Off | 1 | 1 | 0 |
| ⋮ | | | | | | |
| t5 | Low | Open | On | 1 | 0 | 0 |
| t6 | Low | Open | On | 0 | 0 | 1 |
| t7 | Low | Open | Off | 0 | 1 | 1 |
| ⋮ | | | | | | |
| t8 | High | Closed | On | 0 | 0 | 1 |
| t9 | High | Closed | On | 1 | 0 | 0 |
| t10 | High | Closed | Off | 1 | 1 | 0 |
| ⋮ | | | | | | |

FIG. 9

APPARATUS AND METHODS FOR MONITORING WATER CONSUMPTION AND FILTER USAGE

FIELD OF THE INVENTION

The present invention relates to an improved apparatus and method for determining filtered water consumption and usage of a filter cartridge by monitoring the water level in a filtered water container.

BACKGROUND OF THE INVENTION

The quality of drinking water varies widely according to the amount of pollutants in the water source. Home water treatment using replaceable filter cartridges fitted in a filtered water container is a popular method to improve drinking water quality. Within a filter cartridge is a filter medium comprising substances and chemical compounds capable of decreasing the concentration of heavy metals such as copper, cadmium, zinc, aluminum, mercury and free chlorine. Some filter media are also capable of limiting the growth of certain microorganisms. It is known that the performance of the filter medium decreases with usage. Thus, a filter cartridge should be replaced after a known amount of water has filtered through it.

There exist mechanical and electronic mechanisms built into filtered water containers to alert the user of the need to replace the filter cartridge. All such methods and devices suffer from drawbacks.

One group of inventions merely shows the time elapsed from cartridge replacement as the method to indicate cartridge usage. Inventions such as those disclosed in U.S. Pat. Nos. 4,895,648 and 5,665,224 employ a mechanical date indicator to allow a user to record the date of insertion of a new filter cartridge. Such date indicators are intended to remind users to replace the cartridge after a given amount of time has elapsed. Such reminders are not always reliably adhered to. An electronic version of such a device was disclosed in U.S. Pat. No. 6,224,751 B1. In the device, an electronic time counter activated by a push button starts the counting. The indication of the status of cartridge usage is dependent on time elapsed from pushing the start-button. The use of the time-elapse method in calculating cartridge usage is only reliable to the extent that the estimated usage approximates the actual usage. In reality, the usage of the filter cartridge can vary tremendously from the time elapsed since its insertion. Another drawback of the time-elapse method is its reliance on the user to activate the time counting by resetting the date indicator or the electronic time counter, the omission of which renders the method useless.

Another group of inventions are mechanisms built into or around the lid of the filtered water container, which counts the number of times that the lid is opened for water filling. In EP 0,861,809A1 and WO 95/29131, the lid includes a closure plate through which unfiltered water is poured into the filtered water container. The opening and closing movements of the closure plate trigger a mechanical mechanism that advances a rotatable member bearing an indicator, which purportedly indicates the state of usage of the cartridge. U.S. Pat. No. 4,986,901 disclosed a filter bottle cap fitted with a mechanism that advances a counter each time the cap is accessed for water filling.

In WO 96/13318, U.S. Pat. No. 5,900,138 and WO 00/66245, the number of times that the lid of the filtered water container is opened is also counted by mechanical, electronic or electromagnetic means. The devices disclosed in these references are based on the assumption that each time the trigger mechanisms are activated, a theoretically constant amount of water is filled into the filtered water container. However, such an assumption does not account for errors in counting such as when the trigger mechanism is inadvertently manipulated, accessed during cleaning or amounts of water that are less than the actual capacity of reservoir are used.

There also exist references that rely on flow meters to detect the amount of water that has passed through a filtration device for the indication of water filter cartridge usage. For example, U.S. Pat. No. 4,772,386 discloses a water filter cartridge attached to a housing having an impeller driven by water flow. The impeller is connected to a rotating toothed disc, which abrades and cuts a trigger wire after an estimated amount of water has flowed through the impeller. The cutting of the trigger wire shuts off the water flow. U.S. Pat. Nos. 4,681,677, 6,024,867 as well as WO 03/028848 A1 describe flow meters attached to filtration devices. In particular, U.S. Pat. No. 4,681,677 describes the use of a flow meter for monitoring water flowing into a water treatment processor. U.S. Pat. No. 6,024,86 describes the use of the movement of a ball in a water flow channel in order to detect the amount of filtered water flow. WO 03/028848 A1 describes a flow meter fitted to the lid of a filtered water container. The flow meter consists of a turbine wheel, which is rotated by the passage of unfiltered water. The trigger wire method disclosed in U.S. Pat. No. 4,772,386 is imprecise because the cutting efficiency of the toothed disc deteriorates over time and the abrasive resistance of each trigger wire can vary. As with mechanical counting mechanisms described earlier, flow meters can suffer from mechanical breakdown with wear and tear. For the flow meter described in WO 03/028848 A1, in particular, the flow meter can be inadvertently activated during movement of the lid or the filtered water container inadvertently or necessarily.

Other methods of indicating the exhaustion of a filter cartridge rely on the blockage of water flow within the cartridge. U.S. Pat. No. 3,038,610 uses a filter medium that swells upon its exhaustion to block water flow. U.S. Pat. No. 6,428,687 employs a synthetic material to block water flow. These methods, however, only indicate the duration of time that the filter medium has contacted water.

There is accordingly a need for a more accurate and robust method and device for measuring filter usage in a filtered water container.

SUMMARY OF THE INVENTION

The present invention determines filter usage by using a microprocessor-controlled sensor to detect and monitor changes in the level of filtered water in a filtered water container. Further, the present invention provides the additional advantages of monitoring filtered water consumption and current water level within the filtered water container.

One aspect of the present invention provides a water level sensor for measuring a water level of a filtered water container. The water level sensor comprises a detection circuit and a detection sensor. The detection sensor is in electrical communication with the detection circuit. The detection sensor comprises a first electrode pair having a first and second electrode. The first and second electrodes are extended along a length of the filtered water container. The first and second electrodes are spaced sufficiently far apart from each other that a change in an electrical property associated with the first and second electrode, caused by the change in the water level in the filtered water container, is detectable by the detection circuit. In some instances, the electrical property associated with the first electrode and the second electrode is one or more of (i) a change in a resistance across the first and second electrode, a change in a capacitance between the first and second electrode, a change in a voltage across the first and second electrode, and a change in a current across the first and second electrode.

In some embodiments, the water level sensor has a control unit that is in electrical communication with the detection circuit. The control unit is programmed to use the detection circuit and the detection sensor to track the change in water level in the filtered water container and to monitor a status of a water filter in the filtered water container.

In some embodiments, the filtered water container further comprises a switch that is in electrical communication with the detection circuit. This switch is positioned in the filtered water container so that, when the switch is in a first state, the control unit determines that the filtered water container is in a nonfunctional state, and, when the switch is in a second state, the control unit determines that the filtered water container is in a functional state. In such embodiments, the control unit uses an electronic reading from the detection circuit to determine the water level of the filtered water container when the filtered water container is in the functional state. Furthermore, the control unit does not use an electronic reading from the detection circuit to determine the water level of the filtered water container when the filtered water container is in the nonfunctional state.

In some embodiments, the switch is toggled between the first and second state by a user. In some embodiments, the switch is positioned within the filtered water container so that the switch is in the first state when a lid of the filtered water container is open or removed from the filtered water container and the switch is in the second state when the lid is closed or attached to the filtered water container. In some embodiments, the switch is a bubble level switch that includes a first bubble sensor electrode and a second bubble sensor electrode in an enclosure trapping (i) a fluid and (ii) a bubble. In such embodiments, the bubble sensor electrode is in the first state when the bubble contacts the first bubble sensor electrode or the second bubble sensor electrode and the bubble sensor electrode is in the second state when the bubble does not contact the first bubble sensor electrode or the second bubble sensor electrode.

In some embodiments, the control unit determines that the filtered water container is in a functional state when a rate of change in a water level in the filtered water tank is below a predetermined rate and the control unit determines that the filtered water container is in a nonfunctional state when a rate of change in a water level in the filtered water tank is above a predetermined rate. In some embodiments, the water filter container is fitted with a hopper that holds unfiltered water. The hopper is fitted at its base with a removable and replaceable filter cartridge so that water is filtered by draining through a filter medium contained in the filter cartridge into a lower portion of the water filter container.

Another aspect of the invention provides a water level sensor for measuring a water level of a filtered water container. The water level sensor comprises a detection circuit and a detection sensor. The detection sensor is in electrical communication with the detection circuit. The detection sensor comprises a sensor strip that is extended along a length of the filtered water container. The sensor strip houses a plurality of electrode pairs. Each electrode pair in the plurality of electrode pairs comprises a first and second electrode. Each electrode pair in the plurality of electrode pairs is in electrical communication with the detection circuit. The first electrode and the second electrode in an electrode pair in the plurality of electrode pairs are spaced sufficiently far apart from each other on the sensor strip so that a change in an electrical property associated with the first and second electrode, caused by the change in the water level in the filtered water container, is detectable by the detection circuit.

In some embodiments, the electrical property associated with the first electrode and second electrode is one or more of a change in a resistance across the first electrode and the second electrode, a change in a capacitance between the first electrode and the second electrode, a change in a voltage across the first electrode and the second electrode, and a change in a current across the first electrode and the second electrode. In some embodiments, the plurality of electrode pairs comprises between 2 electrode pairs and 10 electrode pairs. In some embodiments, the plurality of electrode pairs comprises more than 10 electrode pairs.

In some embodiments, the water level has a control unit that is in electrical communication with the detection circuit. The control unit is programmed to use the detection circuit and the detection sensor to track the change in water level in the filtered water container and to monitor a status of a water filter that is in the filtered water container.

In some embodiments, the detecting circuit includes a first lead (a), a second lead (b) and a third lead (c). The first lead (a) is in electrical communication with the first electrode in an electrode pair in the plurality of electrodes. The second lead (b) is in electrical communication with the second electrode in an electrode pair in the plurality of electrodes. The third lead (c) and the second lead (b) are in electrical communication across a resistor. The control unit is programmed to set the third lead (c) to a high voltage and the first lead (a) a low voltage each time a first voltage drop is measured at the second lead (b). The control unit is further programmed to set the third lead (c) to a low voltage and the first lead (a) to a high voltage each time a second voltage drop is measured at the second lead (b). In some embodiments, control unit is programmed to switch to a low power consumption idle state when the second lead (b) is in a high voltage state and to a high power consumption state when the second lead (b) drops from a high voltage state to a low voltage state.

Another embodiment of the present invention provides a method of measuring a water level of a filtered water container. The method comprises detecting an electrical property associated with a first electrode and a second electrode in an electrode pair. The first electrode and the second electrode are extended along a length of the filtered water container. The electrical property associated with the first electrode and the second electrode changes with changes in the water level in the filtered water container. A change in the electrical property is determined, thereby allowing for measurement of the water level of the filtered water container. In some embodiments, the electrical property associated with the first electrode and the second electrode is one or more of a resistance across the first electrode and the second electrode, a change in a capacitance between the first electrode and the second electrode, a voltage across the first electrode and the second electrode, and a current across the first electrode and the second electrode. In some embodiments, the method further comprises using the change in the electrical property to track a status of a water filter in the filtered water container.

The present invention thus provides an accurate and robust method and apparatus for indicating water cartridge usage or exhaustion in a filtered water container. It also omits the use of mechanical devices such as flow meters or those that are connected to the lid for opening/closing or access, whose effectiveness can deteriorate with wear and tear.

BRIEF DESCRIPTION OF THE DRAWINGS

Additional objects and features of the invention will be more readily apparent from the following detailed description and appended claims when taken in conjunction with the drawings, in which:

FIG. 6A is an illustration of an alternative embodiment of a water level sensor according to the present invention;

FIG. 6B is a close-up view of the water level sensor of FIG. 6A;

FIG. 6C is a cross-sectional view of the water level sensor of FIG. 6B, taken along line 6C—6C;

FIG. 9 is a timing chart depicting the operation of the voltage dividing circuit of FIG. 8;

Like reference numerals refer to corresponding parts throughout the several views of the drawings.

DETAILED DESCRIPTION OF THE PREFERRED EMBODIMENTS

Overview of the Filtered Water Container

Figure 1:
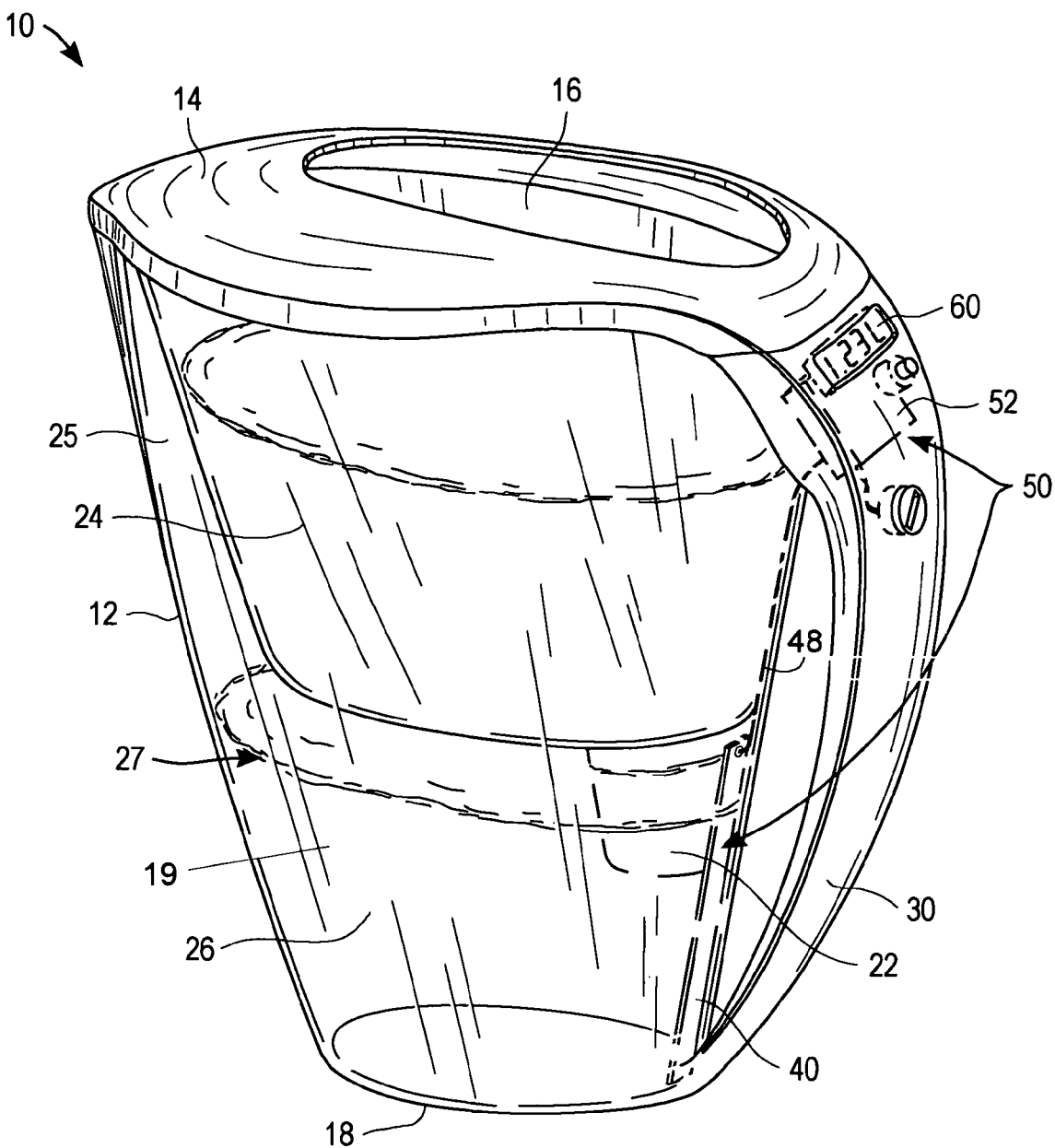
FIG. 1 is an illustration of a filtered water container according to the present invention.

FIG. 1 depicts a filtered water container 10 according to the present invention for providing filtered drinking water while monitoring water level and determining filter cartridge usage. Container 10 has a main body 12, or vessel, preferably dimensioned as a beverage pitcher, and includes at least three removable parts: a lid 14, a hopper 24 and a water filter cartridge 22. Hopper 24 is configured and dimensioned to fit within body 12 and engage with the upper portion of body 12 near lid 14 such that the bottom of hopper 24 and the base 18 of body 12 form a cavity 26 within which filtered water is stored. Filter cartridge 22 is a replaceable filter cartridge and is dimensioned to be removably secured within an opening (not shown) in the bottom of hopper 24, such that a portion of filter cartridge 22 extends into cavity 26. Container 10 also includes a handle 30 attached to or integral with one side of body 12. On an opposite side of body 12, cavity 25 extends past hopper 24 to form a spout to allow the pouring of filtered water from cavity 25 without removal of hopper 24.

In typical use, a new filter cartridge 22 is secured within hopper 24 and unfiltered water is poured through opening 16 and into hopper 24. Hopper 24 temporarily stores water until it flows through filter cartridge 22. Water flows under the force of gravity from hopper 24 through filter cartridge 22, which includes a filter medium for removing impurities in water. The effectiveness of the filter medium has a tendency to decrease with usage over time. After passing through filter cartridge 22, the filtered water falls into cavity 26 where it is stored for later consumption or use. To remove filtered water, a user can simply grasp handle 30 and tilt container 10 to pour the water out of spout 25. Lid 14 optionally includes a spout opening (not shown) to facilitate pouring without removal of lid 14.

The basic configuration of container 10 described thus far is similar to existing containers, for example the Terraillon Aqua 30 and Aqua 40 (Terraillon, BP 73, 78403 Chatou cedex, France). Body 12, lid 14, and hopper 24 are preferably made of plastic (e.g., high-density polyethylene) or any other suitable materials known and used in the art. Filter cartridge 22 can be any suitable water filter cartridge designed or selected to fit within hopper 20. One skilled in the art will appreciate that above-described configuration and features of main body 12, lid 14, hopper 24, and filter cartridge 22 are used for illustrative purposes only, and can be modified without departing from the scope of the present invention.

Water Level Detection and Monitoring System

Referring again to FIG. 1, container 10 includes a unique water level detection and monitoring system 50 comprised of a water level sensor 40 and an electronic control system 52. Water level sensor 40, also herein referred to as a detection sensor or a detector strip, preferably has an elongated shape and is disposed within cavity 26 along an inner wall of body 12. Sensor 40 is preferably oriented vertically and approximately spans the height of cavity 26 between base 18 and bottom of hopper 24 such that, when filtered water is in cavity 26, a lower portion of sensor 40 is below water level 27 and is in contact with water and an upper portion of sensor 40 is above water level 27 and is in contact with air. Water level sensor 40 is in electrical communication with control system 52 through wire 48. Wire 48 is disposed within handle 30 as illustrated in FIG. 1

Figures 2A, 2B:
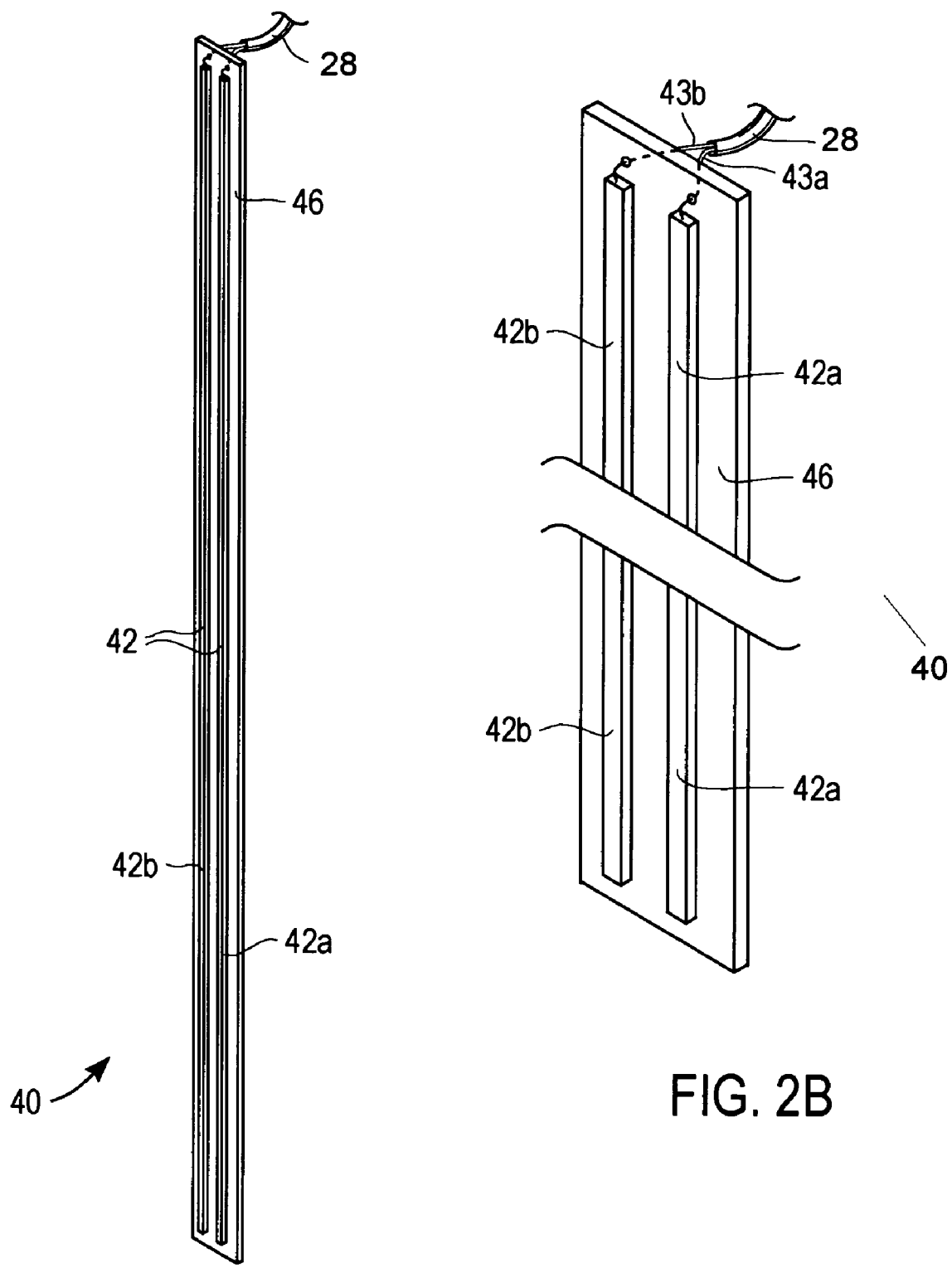
FIGS. 2A and 2B are isolated views of a water level sensor within the filtered water container of FIG. 1.

As shown in FIGS. 2A and 2B, one embodiment of water level sensor 40 comprises an elongated pair 42 of parallel electrodes 42a and 42b attached to a substrate 46. Electrodes 42a and 42b are electrically conducting leads that are separated but positioned in close proximity to one another. Electrode pair 42 extends from the surface of substrate 46 such that, when cavity 26 is filled with water, the portion of electrodes 42a and 42b below water line 27 are in contact with and separated by water, such that the resistance or capacitance between electrodes 42a and 42b varies as a function of water level 27.

Electrodes 42a and 42b can be made of any metallic or non-metallic electrically conducting materials. Preferably, corrosion resistant materials such as chromed-alloy, stainless steel, CoCr, NiCr, semi-precious alloy, titanium alloy, and the like are utilized. In one embodiment, electrodes 42a and 42b are covered with a metallic plating such as gold or platinum to help prevent corrosion. Electrode materials are preferably non-toxic. Substrate 46 is preferably constructed of plastic (e.g., high-density polyethylene, low-density polyethylene, polypropylene, cellulose acetate, rigid vinyl, plasticized vinyl, cellulose acetate butyrate, nylon, polymethylmethacrylate, polystyrene, or acrylonitrile butadienestyrene), ceramics (e.g., silicate ceramics, glass ceramics) or any other relatively non-conducting material, and can be adhered to or imbedded within interior wall of container body 12. In some embodiments, substrate 46 is simply the wall of body 12. Electrodes 42a and 42b are respectively connected to leads 43a and 43b. Leads 43a and 43b conduct electrical currents to and from control system 52. Leads 43a and 43b are insulated from one another, and can be bundled together as a single wire 28.

Figure 3:
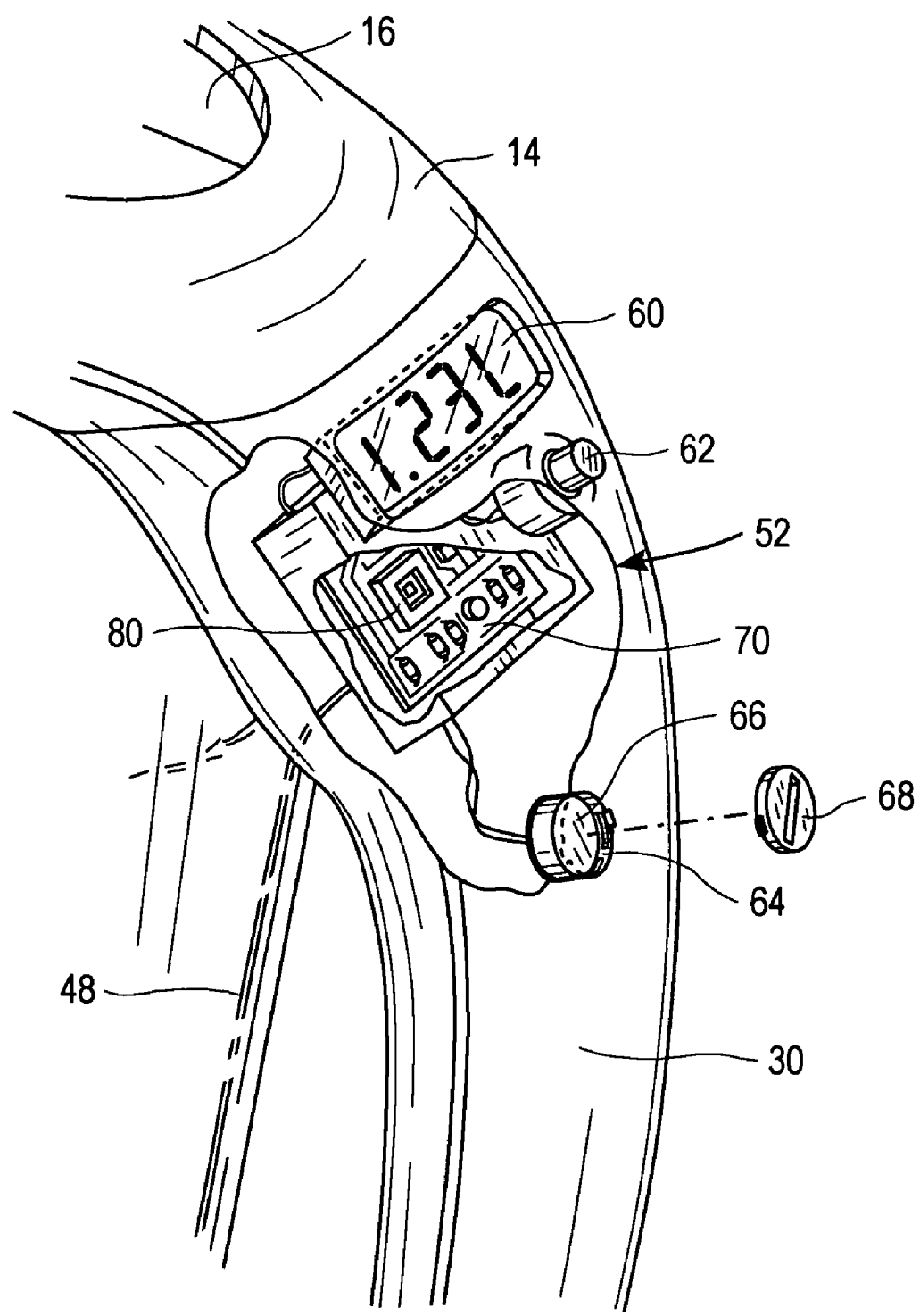
FIG. 3 is a cutaway view of a handle of the filtered water container of FIG. 1, showing an electronic control system according to the present invention.

Referring to FIG. 3, control system 52 includes a control unit 80, detection circuit 70 and a display 60. Control unit 80 is preferably a general purpose microprocessor that communicates with sensor 40, detection circuit 70 and display 60 to provide overall operation and control of water level detection and of monitoring system 50. Alternatively, control unit is an application specific integrated circuit (ASIC) or any other form of processing means. Detection circuit 70 includes one or more of a resistance circuit, a capacitance circuit, an operational amplifier, and/or other means of determining changes in resistance or capacitance between electrode pair 42 and for communicating such change to control unit 80. A battery 66 or other power source provides power for control system 52 and is held within a battery compartment 64 by a battery cover 68. An optional mode button 62 communicates with control unit 80 and allows a user to select between different functions or to display different parameters, such as current water level, total water usage or consumption, elapsed time since last filter change, or remaining filter life measured in terms of any of a variety of metrics such as time remaining, remaining amount of water that can be filtered, or number of fills remaining.

Display 60 is preferably a liquid crystal display (LCD), but other displays or status indicators are within the scope of the present invention. Such alternative arrangements include light emitting diode (LED) or analog displays, or one or more indicator lights that change state, intensity or color to indicate parameters such as water level, total water consumption, or filter life. Control unit 52 preferably has an integrated memory for storing information such as operational parameters, water level data, instructions, component states, and the like. However, system 50 can also incorporate additional memory in addition to or instead of integrated microprocessor memory. Such additional memory can be read only memory (ROM) and/or random access memory (RAM) that is in electrical communication with microprocessor 80.

Operation of Water Level Detection and Monitoring System

Figure 4A:
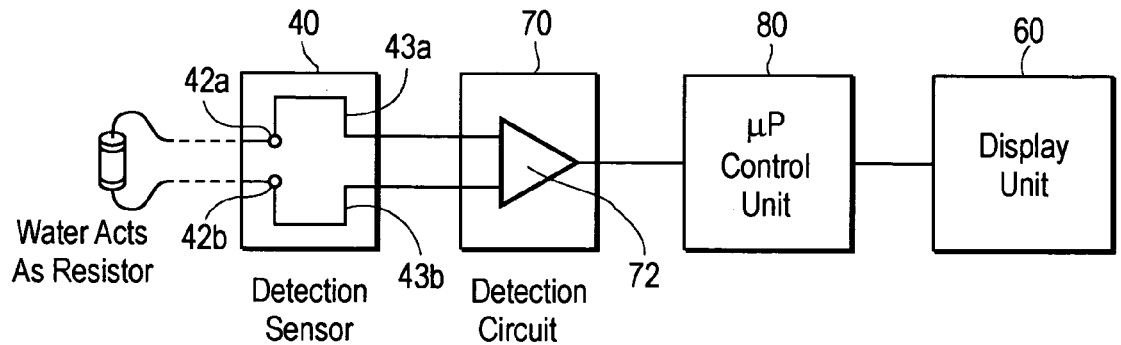
FIG. 4A is a functional block diagram of a water level monitoring system according to the present invention.
Figure 4B:
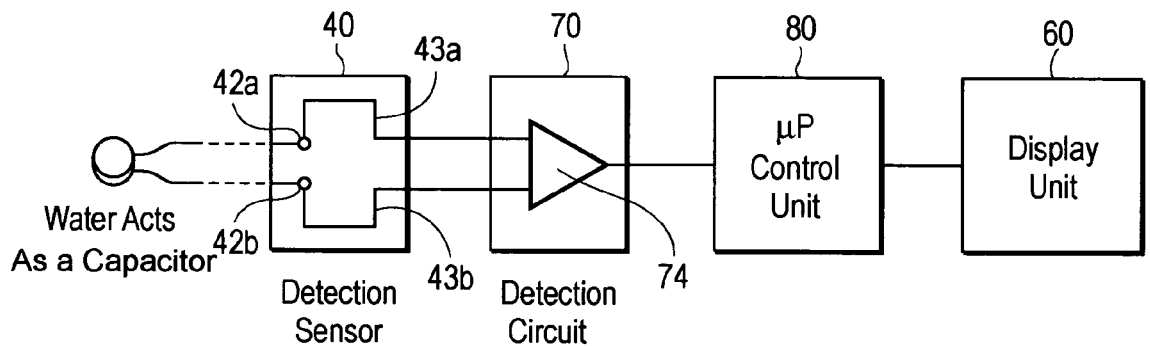
FIG. 4B is a functional block diagram of an alternative water level monitoring system according to the present invention.

FIGS. 4A and 4B are functional diagrams illustrating two embodiments of the operation of water level detection and monitoring system 50. In both cases, system 50 includes detection sensor 40, detection circuit 70, control unit 80, and display unit 60 as shown and described above. In both embodiments, detection sensor 40 is as shown in FIGS. 2A and 2B, including a pair of parallel electrode plates 42a and 42b. A difference between the two approaches lies in the circuit 72, 74 used in detection circuit 70 and whether such circuit 72, 74 is configured to detect changes in resistance across electrodes 42a and 42b (FIG. 4A) or capacitance between electrodes 42a and 42b (FIG. 4B).

Because the resistance of water differs from the resistance of air, the resistance measured across electrode plates 42a and 42b (FIG. 4A) varies as a function of water level 27. Further, because the capacitance of water differs from the capacitance of air, the capacity between electrode plates 42a and 42b (FIG. 4B) also varies as a function of water level 27.

Referring to FIG. 4A, resistance across electrode plates 42 (42a and 42b) is proportional to the amount of contact area between the two electrode plates that is exposed to air when electrode plates 42 complete a direct current (DC) circuit. This is because the electrical resistance of air is much higher than the electrical resistance of water. Therefore, as air is replaced by water between the two electrodes 42, the voltage across electrode plates 42 decreases.

Referring to FIG. 4B, electrical capacitance across electrode plates 42 is proportional to the amount of contact area between the two electrode plates that is exposed to water when plates 42 complete an alternating current (AC) circuit. This is because the dielectric constant of water is about 80 whereas the dielectric constant of air is about 1. Since voltage across plates 42 is given by the equation:

$$\frac{d}{dT}(V_{42a} - V_{42b}) = \left(\frac{I_{42A \rightarrow 42B}}{C}\right)$$

where C is the dielectric constant between plates 42, increasing water will cause the magnitude of voltage to decrease when leads 42 complete an AC circuit.

Accordingly, in both embodiments (FIGS. 4A and 4B), when the contact area of electrode pair 42 increases as filtered water level 27 rises, the voltage across the circuits depicted in FIGS. 4A and 4B drop. Detection circuit 70 detects this drop in voltage and communicates a corresponding signal to microprocessor control unit 80. Microprocessor control unit 80 receives the signal from detection circuit 70 and periodically does one or more of the following: (1) maintains a record of the current water level and/or the change in the water level, (2) calculates the amount of water consumption by monitoring the amount of water that was poured out of the lower portion of container 10, (3) calculates the amount of water filtration by monitoring the amount of water that was filtered into the lower portion of the container, and/or (4) calculates the status of usage of the water filter cartridge by monitoring water consumption and water filtration since the last cartridge replacement. Information regarding any of these measured or calculated parameters can be displayed to a user on display unit 60. Accordingly, some embodiments of the present invention provide a display 60 in electrical communication with a control unit 80, wherein the control unit 80 is capable of causing the display 60 to display information derived from a current water level or a change in current water level in filtered water container 10. In some embodiments, such information includes one or more of a water level of the filtered water level container 10, a status of a water filter cartridge (water filter) 22 that is disposed within the filtered water container 10, a determination of whether the filtered water container 10 is in a functional state, a determination of whether the filtered water container is in a nonfunctional state, a time elapsed or an amount of filtered water consumed since a last filter cartridge change. The display 60 can also display information such as a current time, a warning of overfilling, and a reminder to refill.

It should be noted that the distinct modules of FIGS. 4A and 4B are shown for the purpose of illustration only, and some of the shown modules can be combined into a single physical device with no loss of generality.

Water Level Detection Using Resistance Principles

Figure 5:
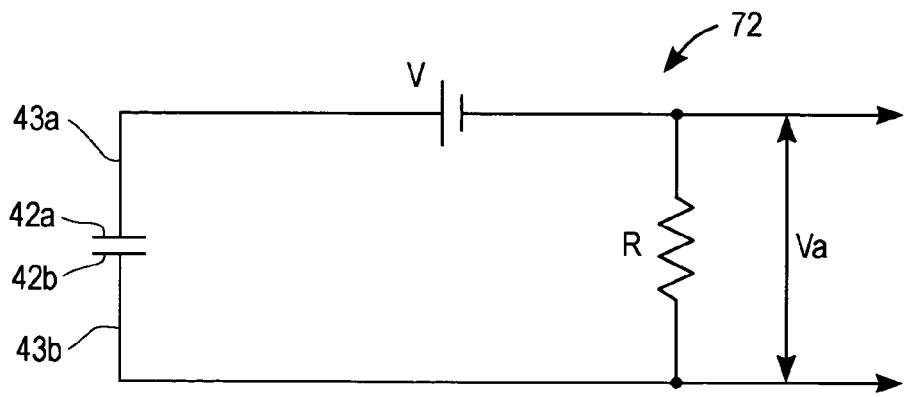
FIG. 5 is a schematic diagram of a detection circuit according to the present invention.

In one embodiment, circuit 72 of FIG. 4A can be described by the circuit illustrated in FIG. 5. A predetermined direct current (DC) voltage V is applied to electrode 43a as determined by control unit 80. Electrode 43b is attached to ground. The resistivity of air is considerably higher than the resistivity of water. Thus, the resistivity R of FIG. 5 will vary as a function of water lever. Because resistivity R of circuit 72 varies as a function of water level 27, an increase in water level will result in a decrease in the resistitivity across leads 42a and 42b. The decrease in resistivity will result in a decrease in voltage. This voltage change is detected by microprocessor control unit 80. Thus, microprocessor 80 uses output voltage Va to calculate water level 27 at any given time.

Water Level Detection Using Capacitance Principles

The example circuit described above with respect of FIG. 5 exploits the difference in the resistance of water and air. However, as shown in FIG. 4B, the detection circuit 70 of the present invention can be configured to detect changes in capacitance between electrodes 42a and 42b in an alternating current (AC) circuit. In such instances, the two electrodes 42a and 42b comprise the two plates of a capacitor, such that when an electric charge Q is applied to one plate 42a of the capacitor, an opposite charge −Q appears on the other plate 42b. The presence of this charge gives rise to a voltage V across the capacitor. This voltage is linearly proportional to the stored charge, according to the equation Q=CV. The quantity C is a constant, usually expressed in picoFarads, known as the capacitance, whose value depends upon the physical structure of the capacitor.

The physical parameters of the "capacitor" that affect C include the effective surface area A of the plates 42a and 42b, the distance D between plates 42a and 42b, and the dielectric constant K of the material between plates 42a and 42b. These parameters are related by the equation:

$$C \approx K(A/D)$$

The dielectric constant is a numerical value on a scale of 1 to 100 that relates to the ability of the dielectric material to store an electrostatic charge. In the instant case, the dielectric material between electrode plates 42a and 42b is either air or water, or some combination thereof. The dielectric constant K of air is 1 and the dielectric constant of water is approximately 80. Here, the distance D between electrode plates 42a and 42b is constant, so the capacitance C of the system is a function of amount of effective surface area between electrodes 42a and 42b that are in contact with, and therefore separated by, water:

$$C \approx (1 \times A_{air}) + (80 \times A_{water})$$

As water level increases, the total capacitance output of the system increases. Such changes in capacitance can be detected by a standard op-amp or capacitance detection circuit within detection circuit 70 in communication with control unit 80, and this signal can be used by the control unit to calculate and monitor water level 27.

Water Level Sensors Having an Array of Electrode Pairs

FIGS. 6–9 depict features and methods of use of an embodiment of the water level detection and monitoring system 50 of filtered water container 10 of FIG. 1, now utilizing a water level sensor 140 having an array of electrode pairs. Referring to FIGS. 6A and 6B, one will recognize that the basic features of sensor 140 are essentially the same as sensor 40 of FIGS. 2A and 2B, except that sensor 140 includes multiple electrode pairs, e.g. 142-1, 142-2, 142-N, rather than a single pair 42 as described with respect to FIGS. 2A and 2B. In some embodiments, N is between 2 and 10. In some embodiments, N is 10 or greater. In some embodiments N is between 10 and 1000. Each respective electrode pair 142 is preferably oriented vertically with respect to neighboring electrode pairs as shown in FIGS. 6A and 6B, such that each pair of electrodes 142 corresponds to a known water level 27. Electrode pairs 142 are attached to or imbedded within substrate 46.

In this embodiment, except for their respective positions along the vertical length of sensor 140, each electrode pair 142 has essentially the same features and characteristics. Each electrode pair 142 comprises two electrically-conducting electrode plates, e.g. 142a-1 and 142b-1, that extend from the surface of substrate 46 into the cavity of container 10. Electrodes 142a and 142b are substantially parallel and in close proximity to one another, but separated from one another by either air (e.g., when water level 27 is below electrode pair 142) or water (e.g., when water level 27 is above electrode pair 142).

Leads 145a and 145b connect electrodes 142a and 142b, respectively, to a detection circuit (e.g., circuit 170 of FIG. 7, described below). In this embodiment, for convenience of design, leads 145a and 145b from each electrode pair 142 is bundled into a lead bundle 154. Each lead, e.g. 145a-1 and 145b-1 is insulated from all other leads such that current does not pass between them.

As described earlier, suitable electrode materials include conducting corrosion resistant materials such as chromed-alloy, stainless steel, CoCr, NiCr, semi-precious alloy, titanium alloy, and the like. In one embodiment, electrodes 142–190 are covered with a metallic plating such as gold or platinum to help prevent corrosion. Electrode materials are preferably non-toxic.

Operation of Water Level Sensors Having an Array of Electrode Pairs

Figure 7:
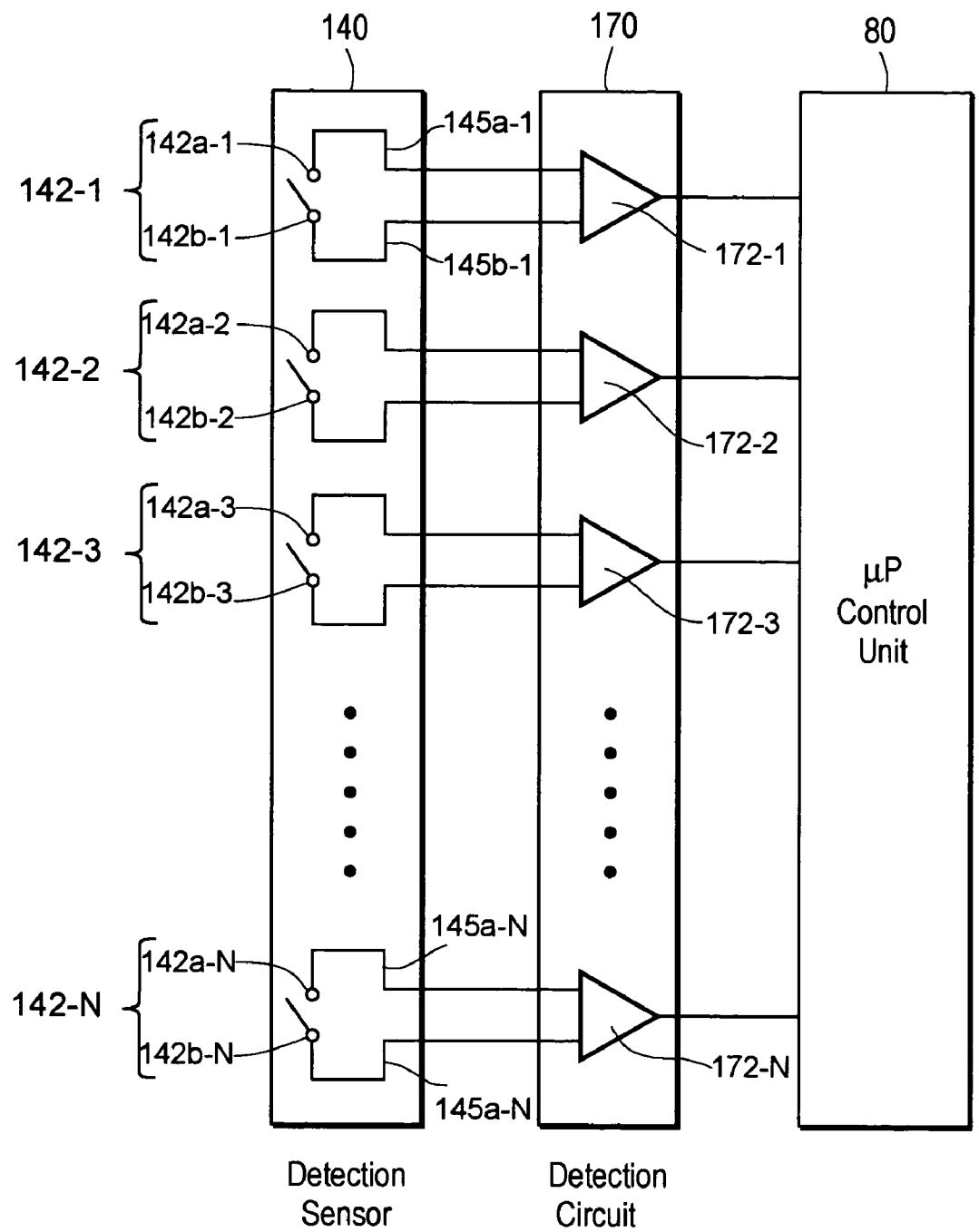
FIG. 7 is functional block diagram of a water level monitoring system incorporating the water level sensor of FIGS. 6A–C.

Referring to the functional diagram of FIG. 7, each electrode pair 142 of detection sensor 140 is connected to a corresponding circuit 172 within detection circuit 170. Each detection circuit 172 communicates with and is controlled by control unit 80 as described with respect to FIGS. 4A and 4B. Control unit 80 continuously, periodically or otherwise polls electrode pairs 142 to obtain signals from detection circuits indicating which electrodes are in contact with water and which are in contact with air. In a power-efficient embodiment described below, with reference to FIGS. 8 and 9, control unit 80 does not poll electrodes, but rather responds to changes in the voltage across the electrodes. In other embodiments, control unit 80 ignores electrodes that are known from previous measurements to be a predetermined distance above and/or below water line 27. Regardless of the polling or sampling method, control unit 80 uses output signals from circuits 172 to determine desired parameters such as current water level, changes in water level, total amount of water filtered or consumed, remaining filter life, etc.

As with FIGS. 4A and 4B, filtered water level 27 is detected for each electrode pair 142 of FIG. 7 by its corresponding detection circuit 172 measuring a change in voltage between each electrode pair, e.g. between electrode pair 142*a*-1 and 142*b*-1. The voltage across those electrode pairs immersed in water will be determined by the properties of water whereas the voltage across those electrode pairs above the water level will be determined by the properties of air. Water level 27 is then calculated as being at or slightly above the highest pair of electrodes exhibiting a voltage that is determined by that of water. In such embodiments, there is no need for calibration of resistance or capacitance measurements between a particular electrode pair by microprocessor 80, as microprocessor 80 simply determines whether resistance (or alternatively capacitance) between a pair of electrode plates, e.g. 142*a*-1 and 142*b*-1, is either high or low.

Resolution of the system is determined by the vertical length of the electrode pairs, the number of electrode pairs, and vertical distance between neighboring electrode pairs, and, in some instances, how often the electrodes are sampled. More electrode pairs, and/or smaller vertical spaces between electrode pairs provides greater resolution. In an alternative embodiment, the microprocessor resolves fine changes in water level, e.g., within the span of one electrode pair, by calculating graded changes in resistance or capacitance between and electrode pair as a function of water level as described above with respect to FIGS. 4A, 4B and 5.

Power-Efficient Water Level Detection Circuit

Figure 8:
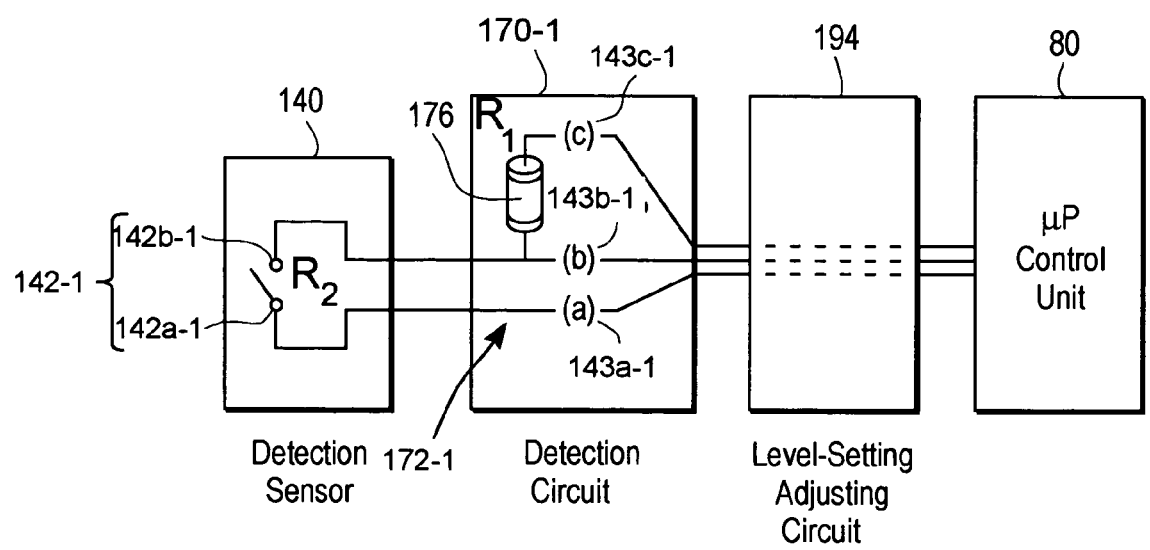
FIG. 8 is a is functional block diagram depicting a voltage divider detection circuit within the water level monitoring system of FIG. 7.

FIG. 8 illustrates an example of a power efficient detection circuit according to one embodiment of the present invention. One skilled in the art will appreciate that while only one electrode pair 142 (142-1) and circuit 172 (172-1) is shown in FIG. 8, the following functional description applies to each of the electrode pairs 142 and corresponding circuits 172 shown in FIG. 7.

In this embodiment, circuit 172-1 is a voltage divider circuit comprising three leads, 143*a*-1, 143*b*-1 and 143*c*-1 that are also respectively referred to as leads "(a)", "(b)" and "(c)". As shown and described above, lead 143*a*-1 is electrically connected to electrode 142*a*-1 and lead 143*b*-1 is electrically connected to electrode 142*b*-1. Lead 143*c*-1 is also electrically connected to electrode 142*b*-1 through resistor 176 ($R_1$). All three leads (a), (b) and (c) are in electrical communication with control unit 80, which provides control and input signals to and receives output signals from circuit 172-1. Optionally, level-setting adjusting circuit 194 is used to adjust signals coming into or out of control unit 80. Such level-setting adjusting circuit 194 is needed in some instances to reduce the range of voltages and currents produced by detection circuit 170 to the dynamic range of control unit 80.

Circuit 172-1 is designed to communicate to control unit 80 changes in the state of electrode pair 142-1, e.g., whether the electrode pair is in contact with water or not. As described above, the voltage across the electrode pair is different when the pair is immersed in air as opposed to water. Conceptually, therefore, electrode pair 142-1 is shown and described herein as a switch 142-1, where the switch has two possible states: open or closed. When water level reaches electrode pair 142-1, the presence of water between electrodes 142*a*-1 and 142*b*-1 reduces the resistance between these electrodes from a very large value that effectively does not allow current to flow, to one that allows current to flow. Thus, when water reaches electrode pair 142-1, the circuit 170 is closed. Conversely, when the water level is below electrodes, relatively little or no current flows between electrodes 142*a*-1 and 142*b*-1 and circuit 170 is open. When (a) is connected to a low voltage (e.g., a ground voltage) and (c) is connected to a high signal voltage, the voltage at (b) is determined by the voltage divider formula:

$$V_{OUT} = V_{IN}\left[\frac{R_2}{R_1 + R_2}\right]$$

where $R_1$ is the resistance resistor 176 and $R_2$ is the resistance across leads 142*a* and 142*b*.

FIG. 9 is a timing diagram illustrating typical operation of circuit 170 of FIG. 8. In general, leads (a) and (c) carry input signals from control unit 80 and lead (b) conducts output signals to control unit 80. Although signals may be AC or DC signals of known values, signals delivered to the circuit via leads (a) and (c), and received from the circuit via (b), will be described here as either low ("0") or high ("1"). At an arbitrary starting time, to, water level is "Low" meaning that air rather than water separates electrodes 142*a*-1 and 142*b*-1. Therefore, switch 142-1 is considered "open". In this state, control unit 80 has provided a high voltage to (c) and a low voltage to (a). The high resistance properties of air dominate the voltage divider circuitry, with a very high $R_2$. Thus, $V_{IN}$ equals $V_{OUT}$. As such, the output voltage at (b) is the same as $V_{IN}$, which is considered a logical "high." In this high output (b) state, control unit 80 remains "off", or idle with respect to circuit 170. At time t1, the water level is still low, the switch is still open, the voltage states of (a), (b) and (c) remain the same, and microprocessor 80 remains idle.

At time t2, water level increases and is high. This means that electrodes 142*a*-1 and 142*b*-1 are immersed in water. Now $R_2$ is determined by the resistive properties of water rather than air. $V_{OUT}$ no longer equals $V_{IN}$. For $R_1$ with suitably chosen values, $V_{OUT}$ will be substantially less than that of $V_{IN}$. As a result, there will be a voltage drop at (b), shown now as in state "0", or "low." The change in lead (b) from the high voltage state to the low voltage state causes microprocessor 80 to wake up (turn "on"). The fact that the voltage at lead (b) has dropped from logical high to low means that water level 27 has surpassed the physical position of the corresponding leads 142 in the water tank and this fact is noted by microprocessor 80 and stored in memory within the microprocessor or associated with the microprocessor.

At a time t3, microprocessor 80 reverses voltage states of (a) and (c), such that terminal (a) is now at a high voltage and terminal (c) is now at a low voltage. The reversal of the voltages at terminals (a) and (b) cause the voltage at terminal (b) to adopt the value $V_{OUT}$, where $$V_{OUT} = V_{IN}\left[\frac{R_1}{R_2 + R_1}\right]$$

Since $R_2$ remains small because sensor 142 is immersed in water, and since $R_1$ is constant, the reversal of the voltage states at leads (a) and (c) immediately causes the voltage at terminal (b) to switch from low to high as noted at time t4 in FIG. 9. It will be appreciated that t4 and t3 occur instantaneously but have been written out as discrete steps for ease of understanding the inventive circuitry. Once microprocessor 80 reverses the voltages at step t3, it is free to turn itself off until the voltage at line (b) drops to a low voltage indicating that electrode pair 142 is no longer immersed in water.

When water level decreases at a later arbitrary time t5, electrode pair 142 contacts air and the logical switch defined by electrode pair 142 is once again in the open state. The opening of switch 142 means that $R_2$ becomes large. Therefore $V_{OUT}$ decreases meaning that there is a voltage drop at (b). The voltage drop at (b) causes microprocessor 80 to wake up from its idle state and to note the change in water level below electrode pair 142.

Immediately after time t5, microprocessor 80 again reverses input voltages of leads (a) and (c), such that lead (a) becomes low and lead (c) becomes high. Thus, the voltage at lead (b) is once again defined by the equation:

$$V_{OUT} = V_{IN}\left[\frac{R_2}{R_1 + R_2}\right]$$

As such, at time t7, the voltage at terminal (b) is returned to the high state because $R_2$ is large. Further, at time t7, the microprocessor again returns to the idle state. At time t7, switch 142, microprocessor 80 and leads (a), (b) and (c) are in the same state that they were in at time t0, with microprocessor waiting in an low power consumption idle state that will only be disturbed by a voltage drop at lead (b). At some later time t8, water level increases again such that it immerses leads 142, and the cycle described for times t0–t7 starts again.

The exemplary circuit shown and described in FIGS. 8 and 9 relates to one electrode pair 142 in the array of electrode pairs 142 of sensor 140. One of skill in the art will appreciate that, in a preferred embodiment, each electrode pair is connected to a separate voltage divider circuit such that changes in the state of every electrode in the array can be monitored by processor 80. This approach is advantageous from a power efficiency standpoint because, while microprocessor 80 is constantly ready to respond to changes in water level, it remains idle until such a change occurs. Moreover, even when a change occurs, microprocessor 80 effectively ignores all electrodes 142 except those that are directly affected by the change in water level at any given time. Another advantage of the exemplary circuitry is that very little current is run through the detection circuitry. The instant a voltage drop occurs at (b) indicating that a current is running through 142-1, the voltages at (a) and (c) are reversed thereby stopping the current. This has the beneficial effect of prolonging battery life and reducing corrosion at leads 142.

One skilled in the art will appreciate that the capacitance principles discussed above with respect to FIG. 4B can be applied to configure detection circuit 170 such that circuits 172 detect changes in capacitance at electrode pairs 142 with increases or decreases in water level. Such capacitance circuits need only detect whether capacitance is high or low at a given sensor. For example, the uppermost sensor with a high capacitance indicates water level. Optionally, a power-efficient circuit such as that described above could be configured to detect changes in capacitance using capacitance principles described herein.

Alternative Water Level Sensors

Figure 10:
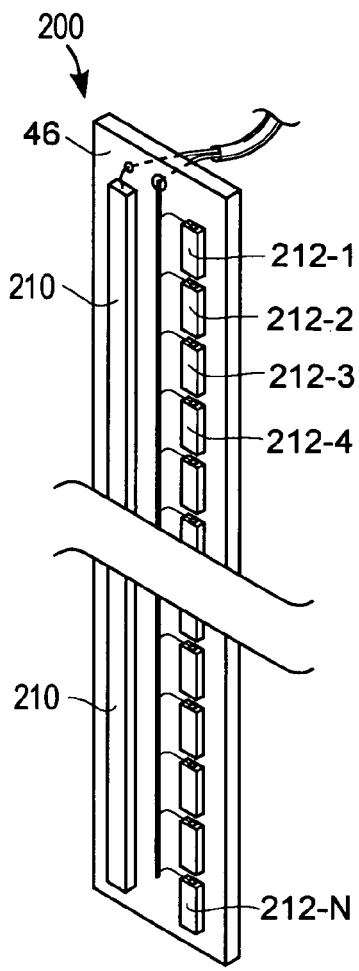
FIG. 10 is another embodiment of a water level sensor according to the present invention.
Figure 11:
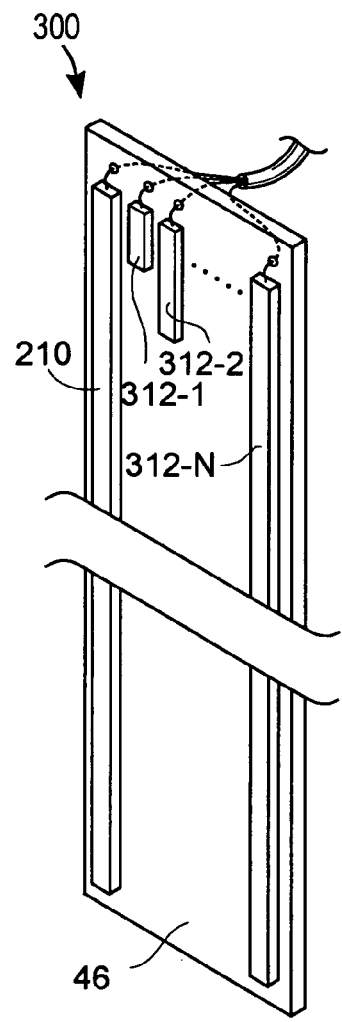
FIG. 11 is still another embodiment of a water level sensor according to the present invention.
Figure 12:
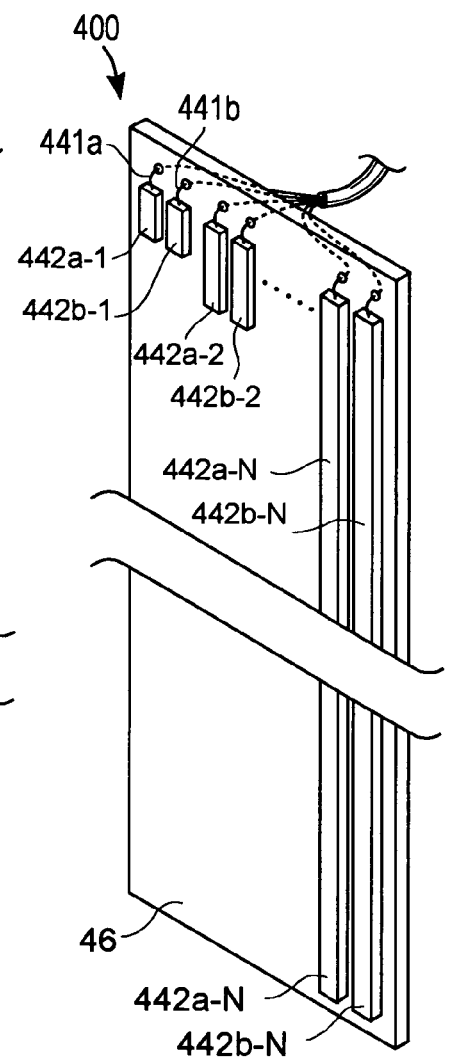
FIG. 12 is yet another embodiment of a water level sensor according to the present invention.

FIGS. 10–12 depict alternative embodiments of water level sensor 40. Referring to FIG. 10, a water level sensor 200 comprises a substrate 46 having a long vertical electrode 210 juxtaposed to a vertical array of smaller electrodes 212-N. Electrode 210 is similar to one of electrodes 42a or 42b of FIG. 2A, while each electrode in electrodes 212-N is similar to an electrode 142a or 142b of FIG. 6A. Electrodes 210 and 212 are attached to or imbedded within substrate 46, and extend from the surface of substrate 46 such that any water in cavity 19 of container 10 contacts the electrodes. In this embodiment, sensor 200 can function essentially as sensor 140 described above with respect to FIGS. 6–9, with electrode 210 acting as a common electrode forming an electrode pair with each of electrodes 212. Each electrode 210 and 212 is connected by a lead to detection circuitry such as detection circuit 170. Detection circuit 170 can be configured to detect changes in resistance or capacitance at each electrode pair as described above. The advantage of sensor 200 (FIG. 10) over sensor 140 (FIG. 6A) is that sensor 200 is cheaper to build because it contains less discrete parts and less wiring.

In another embodiment, water level sensor 300 of FIG. 11 includes common electrode 210 attached to substrate 46. However, instead of a vertical array of essentially identical short electrodes 212 as in sensor 200, sensor 300 includes a parallel array of vertically-oriented electrodes 312 of varying length. Water level sensor 300 relies on the principle that the resistance between electrode 210 and an electrode 312 will measurably decrease as soon as water immerses the tip of an electrode 312. Thus, an array of electrodes 312, with each electrode 312 have a different predetermined length, can be used to determine water level using the resistance principles discussed above.

In another embodiment, water level sensor 400 of FIG. 12 includes parallel pairs of electrodes 442, with each electrode pair 442 comprising a first electrode 442a and a second electrode 442b. As with other sensors described herein, the electrodes are mounted on, attached to, or imbedded into substrate 46 such that they extend from the substrate and contact either air or water. As with sensor 300, the top edge of each electrode pair is aligned near the top of sensor 400. Each electrode in a pair, e.g., 442a-1 and 442b-1, has the same length. However, in preferred embodiments, each pair of electrodes 442 has a unique length in sensor 400, as illustrated in FIG. 12. For example, electrodes 442a-1 and 442b-1 span only a short vertical distance from the top of sensor 400, while electrodes 442a-N and 442b-N span essentially the entire vertical length of sensor 400. Electrode pairs between 442-1 and 442-N are of intermediate lengths, such that each electrode pair corresponds to a particular water depth. Each electrode is connected by a respective lead 441 to detection circuitry as described above. In use, electrode 400 functions essentially the same as electrode 140 (FIG. 6B) described above.

It shall be noted that the shapes and configurations of electrodes shown and described herein are only examples and are not meant to be limiting. Other configurations, materials, and methods of manufacture can be used without departing from the scope of the present invention.

Figure 13:
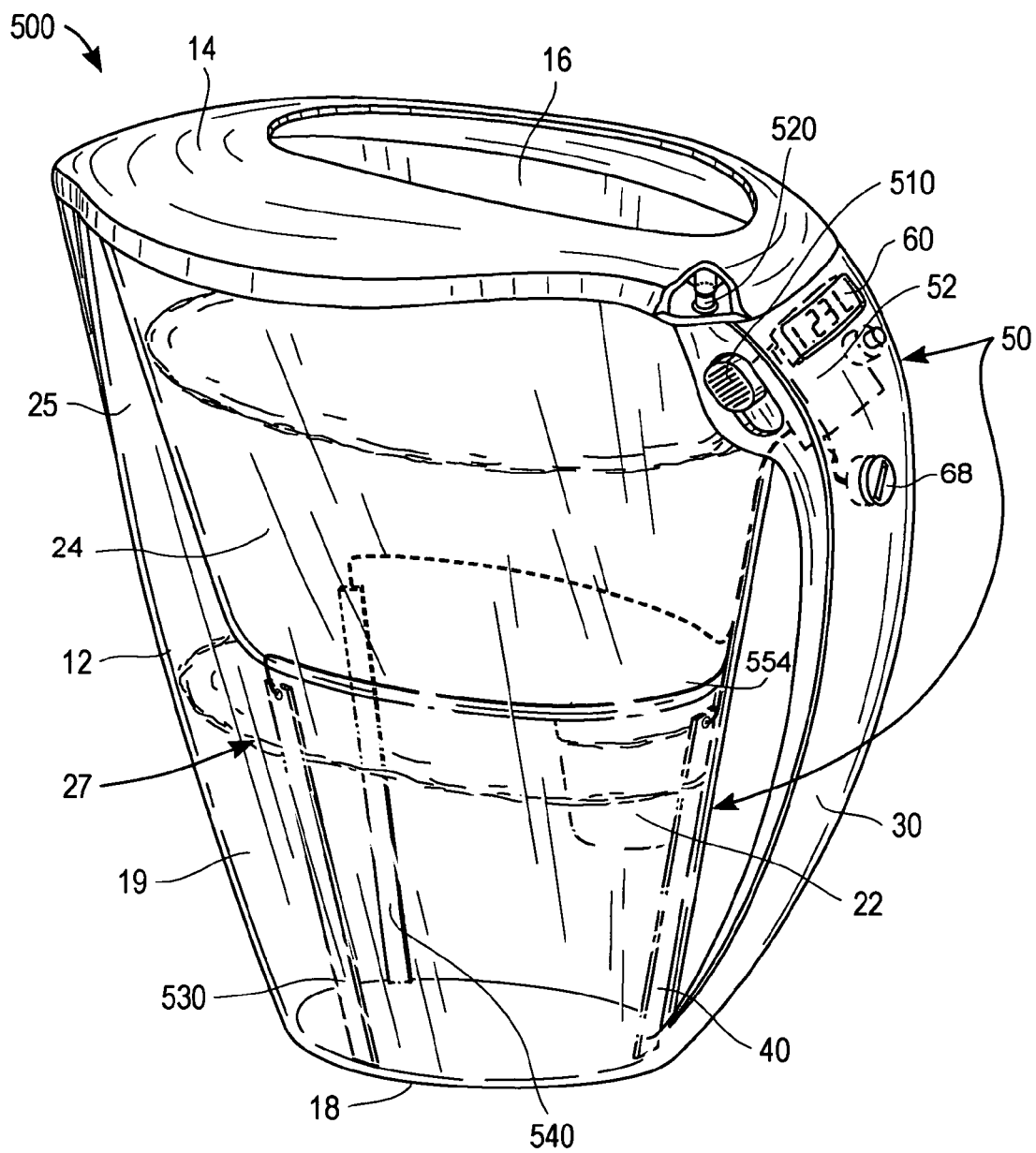
FIG. 13 is an illustration of an alternative embodiment of the filtered water container according to the present invention.

Alternative and Additional Features of the Inventive Filtered Water Containers FIG. 13 illustrates container 500, which represents an alternative embodiment of the present invention. Container 500 is essentially the same as container 10 (FIG. 1), except that it includes additional optional features to improve accuracy of determinations such as cumulative water usage and filter cartridge status by allowing manual or automatic inactivation of water level detection and monitoring system 50 during certain "non-functional" periods or events such as cleaning and tilting of the container.

Body 12, lid 14, hopper 24 and filter cartridge 22 of container 500 are all essentially the same as described with respect to FIG. 1. The basic components of water level detection and monitoring system 50 are also essentially the same, including water level sensor 40, electronic control system 52 (including detection circuit and control unit which are not shown), and display 60. In addition to these components, however, container 500 optionally includes one or more switches 510 and 520 that are electronically connected to electronic control system 52. In some embodiments, container 500 contains a switch (not shown) between hopper 24 and body 12. When hopper 24 is removed from body 12, this switch is in a first state, indicating that filtered water container 500 is in nonfunctional state and when the hopper is fitted within body 12 as illustrated in FIG. 13, this switch is in a second state, indicating filtered water container 500 is in a functional state.

Container 500 also optionally includes one or more additional water level sensors 530 and 540 that are electrically connected by one or more wires (e.g., wire 554) to electronic control system 52, and work in conjunction with water level sensor 40. In such embodiments, each sensor 40, 530, and 540 may be any of sensors 40 of FIGS. 2A and 2B, sensor 140 of FIGS. 6A and 6B, sensor 200 of FIG. 10, sensor 300 of FIG. 11, sensor 400 or FIG. 12. In such embodiments, microprocessor uses electrode pairs from any combination of sensors 40, 530, and 540 to determine the water level 27 of container 500. Furthermore, the use of multiple sensors 40, 530, and/or 540 in a configuration such as that illustrated in FIG. 13 provide additional advantages that will be described in detail below.

Switches for Determining Non-Functional Periods of Use

Switches 510 and 520 can be electromechanical, electromagnetic, optical or otherwise, and may be operated manually, e.g., by a user, or automatically, e.g., by the removal or misplacement of some component of container 500. For example, switch 510 is shown as a manual mechanical slide switch that may be toggled by a user to turn off, suspend, or reset operation of water level detection and monitoring system 50. For example, it may be desirable to suspend operation of system 50 in order to differentiate the change of water level in the lower portion of the container during normal consumption/filtration from non-functional periods such as cleaning of the container with water. Optionally, turning off switch 510 could cause system 50 to reset, such as when a new filter cartridge 22 is installed or when a user wishes to reset cumulative water usage or consumption calculations.

Optional lid switch 520 is depicted as an automatic button or spring switch that is activated when lid 14 is removed. As with manual switch 510, lid switch 520 is electrically connected to electronic control system 52 such that it can be used to suspend operation of water level detection and monitoring system 50, for example by sending a signal to microprocessor 80 or by causing an interruption in the detection circuit. In such instances, operation of system 50 resumes when lid is re-attached in proper fashion to body 12. Additional or alternative switches, whether electromechanical, electromagnetic, optical or otherwise, can be used to detect proper contact between hopper 24 and body 12, lid 14 and hopper 24, or any combination thereof. The proper contact between these parts signals the control system 52 to differentiate the status of the water container 500 between periods of normal consumption/filtration and nonfunctional periods (e.g. while container 500 is being cleaned).

Alternatively, or in combination with the use of switches, control system 52 can be programmed to differentiate a change in water level 27 in normal consumption/filtration from non-functional changes in water level 27 by computing and analyzing the rate of water level change. Such non-functional changes in water level 27 include its change during filling and emptying container 500 with water during cleaning, during pouring of filtered water out of the lower portion of container 500, and movement of the water level 27 during transportation of container 500. Thus, sampling of the water level 27 during these non-functional changes in water level 27 will cause inaccuracy in computing information such as filtered water consumption and usage of the removable filter cartridge 22. The rate of water filtration through a cartridge 22 with a known amount and chemistry of its filter medium can be experimentally determined. Although the filtration rate may decrease with usage, particularly if the water contains particulate matters, the variation in the filtration rate remains relatively constant throughout the life of a cartridge. Since non-functional changes in water level 27 are most likely faster than its change during filtration, the microprocessor in control unit 52 can ignore non-functional changes in water level 27 when monitoring water consumption or water filtration since the last cartridge 22 replacement.

Bubble Level Switch

Figure 14:
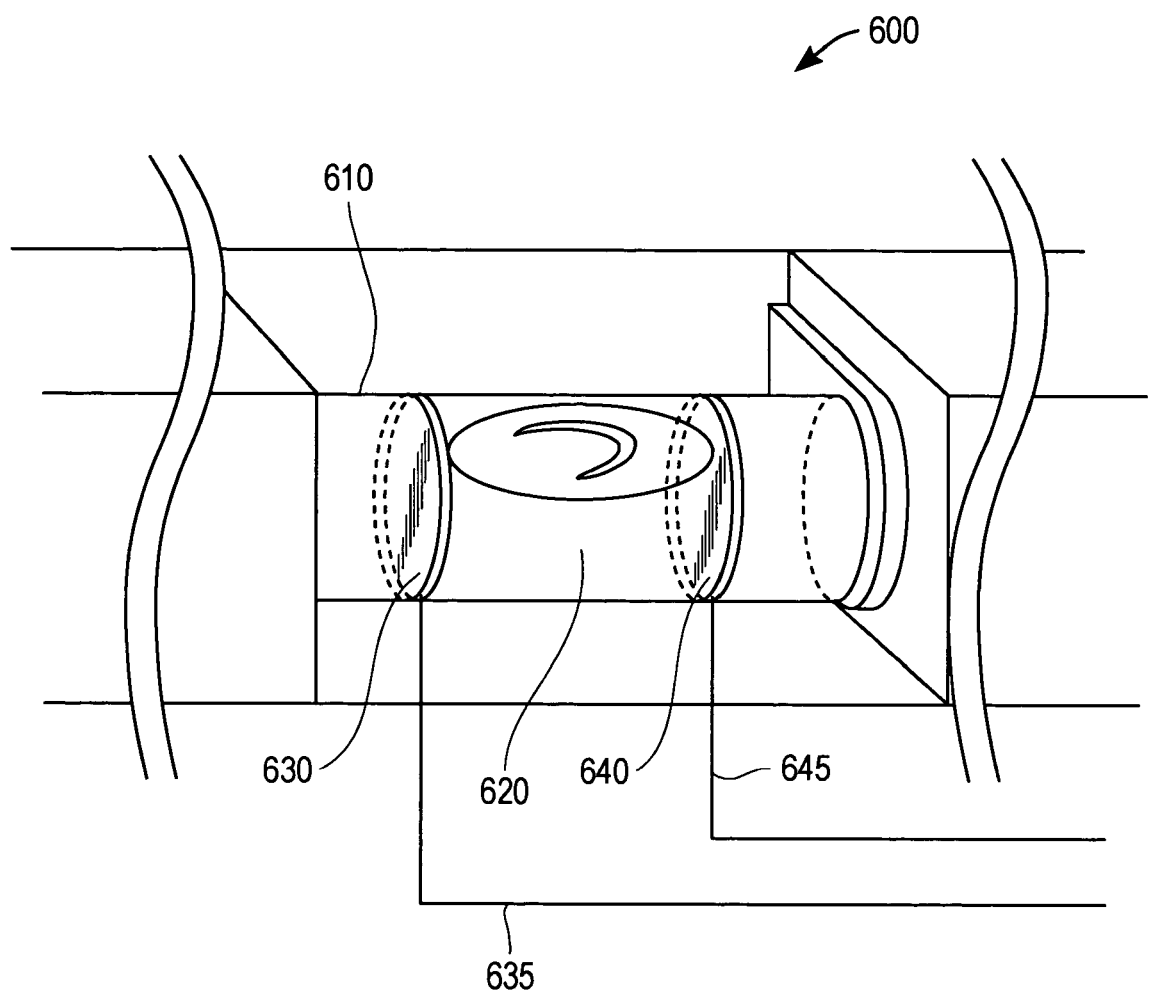
FIG. 14 is a schematic diagram of a bubble switch according to the present invention.

In an alternative embodiment of the invention, a bubble level switch 600 as shown in FIG. 14, is used to avoid erroneous detection in the change of water level that may occur when the water container is stored in a tilted position or else due to non-functional changes of water level. Bubble level sensor 600 is comprised of an enclosure 610 containing two electrodes 630 and 640 separated by a defined amount of liquid 620 that conducts electricity. The amount of liquid 620 in enclosure 610 is less that the volume of enclosure 610 between the two electrodes 630 and 640, such that a bubble of air or other gas is present between electrodes 630 and 640. Electrodes 630 and 640 are connected externally by leads 635 and 645, respectively, to detection circuit 70 or 170 and microprocessor 80 as shown in FIGS. 4 and 7. The current pathway between electrodes 630 and 640 within enclosure 610 is established when the liquid 620 level is essentially horizontal. When level sensor 600 is tilted, bubble 620 moves toward the higher electrode 630 or 640 and causes a change or interruption in the resistance, capacitance or other measurable property between electrodes 630 and 640, which is then detected by control unit 80.

The ability of this embodiment of the invention to detect a stationary horizontal water level allows the control unit 80 to distinguish and factor into its calculations the changes in water level 27 during normal consumption/filtration from that due to tilted water container positions or non-functional changes. A further advantage of being able to detect a stationary horizontal water level 27 is the simplicity in programming the control unit 80 to record, monitor and analyze water level 27 only if the detection circuitry detects a stationary horizontal water level. Yet another related advantage provided by the method is obviating the need for control unit 80 to store or else analyze data such as the rate of change in water level and the filtration rate of a given cartridge 22. In a preferred embodiment of the invention, the control unit 80 can generate an audible and/or visual signal to alert the user to upright the storage position of container 500 for proper monitoring of water consumption and water filtration, or else for the prevention of tipping over of container 500.

Multiple Detection Sensors

Referring again to FIG. 13, the ability of the control unit to monitor water level change during normal consumption/filtration is enhanced by the inclusion of one or more additional detection sensors 530 and 540 located along the inner wall of the lower portion 19 of filtered water container 500, and are positioned as far apart as possible. As discussed above with respect to sensor 40 and 140, the water level at each detector strip is detected, recorded, monitored and analyzed by the electronic control system 52, including detection circuit 70 and control unit 80 as described above. Using multiple detection sensors 40, 530 and 540, the detection circuit and the control unit together are capable of detecting a stationary horizontal water level with container 500 being placed on a relatively horizontal surface during normal consumption/filtration. In contrast, with a single detector strip 40, an erroneous detection in the change of water level can occur when the filtered water container 500 is stored in a tilted position or else due to non-functional changes of water level.

In another embodiment of the invention utilizing multiple detection sensors 40, 530 and 540, the filtered water level 27 can be measured and monitored conveniently even if the filtered water container is perpetually in motion or perpetually titled, such as its use in an automobile or on an airplane. The filtered water level 27, whether stationary or not, can be viewed three-dimensionally as a plane that transverses the water surface. With at least three detector strips 40, 530 and 540, the position of the water surface 27 plane in space is detected instantaneously. Hence, the volume of filtered water in the lower portion 19 of filtered water container 500 can be computed even if the water level is not stationary.

The illustrative descriptions of the application of the principles of the present invention are to enable any person skilled in the art to make or use the disclosed invention. All references cited herein are incorporated by reference herein in their entirety. These descriptions are susceptible to numerous modifications and alternative arrangements by those skilled in the art. Such modifications and alternative arrangements are not intended to be outside the scope of the present invention. The appended claims are intended to cover such modifications and arrangements. Thus, the present invention should not be limited to the described illustrative embodiments but, instead, is to be accorded the broadest scope consistent with the principles and novel features disclosed herein.

What is claimed is:

1. A water level monitoring system for determining an amount of water added to and/or consumed from a filtered water container comprising:

a detection sensor comprising an electrode pair, the electrode pair comprising a first electrode and a second electrode spaced sufficiently apart from each other so that an electrical property associated with the first and second electrodes that changes with changes in a water level in said filtered water container can be detected;

a detection circuit connected to the electrode pair in the detection sensor and capable of generating signals based on the electrical property associated with the electrode pair; and a control unit connected to the detection circuit and capable of receiving signals from the detection circuit, wherein the control unit determines changes in the water level in said filtered water container from the signals received from the detection circuit and thereby determines said amount of filtered water added to and/or consumed from said filtered water container over a period of time in which water is added to and consumed from the container.

2. The system of claim 1 wherein the electrical property associated with the first electrode and the second electrode is one or more of:

a resistance across said first electrode and said second electrode, a change in a capacitance between said first electrode and said second electrode, a voltage across said first electrode and said second electrode, and a current across said first electrode and said second electrode.

3. The system of claim 1, further comprising a switch that is in electrical communication with said control unit wherein, when said switch is in a first state, said control unit determines that said filtered water container is in a nonfunctional state, and when said switch is in a second state, said control unit determines that said filtered water container is in a functional state, and wherein said control unit determines changes in water level occurring when said filtered water container is in said functional state, and said control unit does not determine changes in water level occurring when said filtered water container is in said nonfunctional state.

4. The system of claim 3 wherein said switch is toggled between said first state and said second state by a user.

5. The system of claim 3 wherein said switch is positioned within said filtered water container so that said switch is in said first state when a lid of the filtered water container is open, and said switch is in said second state when said lid is closed.

6. The system of claim 3 wherein said switch is a bubble level switch that comprises a first bubble sensor electrode and a second bubble sensor electrode in an enclosure trapping (i) a fluid and (ii) a bubble; wherein said bubble sensor electrode is in said first state when said bubble contacts one of said first bubble sensor electrode and said second bubble sensor electrode; and said bubble sensor electrode is in said second state when said bubble does not contact said first bubble sensor electrode or said second bubble sensor electrode.

7. The system of claim 1 wherein:

said control unit determines that said filtered water container is in a functional state when a rate of change in a water level in said filtered water tank is below a predetermined rate;

said control unit determines that said filtered water container is in a nonfunctional state when a rate of change in a water level in said filtered water tank is above a predetermined rate;

said control unit determines changes in water level occurring when said filtered water container is in said functional state, and said control unit does not determine changes in water level occurring when said filtered water container is in said nonfunctional state.

8. The system of claim 3 wherein the filtered water container is fitted with a hopper that holds unfiltered water and wherein the hopper is fitted at its base with a replaceable filter cartridge so that water is filtered by draining through the filter cartridge into a lower portion of the water filter container; and wherein said switch is positioned within said filtered water container so that said switch is in said first state when the hopper is removed from said filtered water container, and said switch is in said second state when said hopper is fitted within said filtered water container.

9. The system of claim 1 wherein the filtered water container is fitted with a hopper that holds unfiltered water and wherein the hopper is fitted at its base with a replaceable filter cartridge so that water is filtered by draining through the filter cartridge into a lower portion of the water filter container.

10. The system of claim 1, further comprising a display in electrical communication with said control unit, wherein the control unit is capable of causing the display to display information derived from the changes in water level.

11. The system of claim 1, further comprising a display in electrical communication with said control unit, wherein the control unit is capable of causing the display to display one or more of a water level of said filtered water level container, a status of a water filter that is disposed within said filtered water container, a determination of whether said filtered water container is in a functional state, a determination of whether said filtered water container is in a nonfunctional state, a time elapsed or an amount of filtered water consumed since a last filter cartridge change, a current time, a warning of overfilling, or a reminder to refill.

12. The system of claim 1 wherein said detection sensor further comprises one or more additional electrode pairs, each electrode pair comprising a first electrode and a second electrode spaced sufficiently apart from each other so that an electrical property associated with the first and second electrodes that changes with changes in the water level can be detected, said detection circuit further comprises one or more additional circuits corresponding to the one or more additional electrode pairs, wherein each circuit in the detection circuit is connected to its corresponding electrode pair in the detection sensor and is capable of generating a signal based on the electrical property of its corresponding electrode pair; and said control unit is capable of receiving the signals from the one or more circuits in the detection circuit and determines changes in the water level in said filtered water container from the signals received from the one or more circuits in the detection circuit and thereby determines an amount of filtered water consumption.

13. The system of claim 12 wherein the electrical property associated with said first electrode and said second electrode in said one or more additional electrode pairs is one or more of:

a resistance across said first electrode and said second electrode, a capacitance between said first electrode and said second electrode, a voltage across said first electrode and said second electrode, or a current across said first electrode and said second electrode.

14. The system of claim 12 wherein said control unit determines changes in filtered water level based on the electrical properties associated with at least two electrode pairs.

15. The system of claim 1, wherein the control unit monitors a status of a water filter that is in said filtered water container based on signals received from said detection circuit.

16. A water level monitoring system for determining an amount of water added to and/or consumed from a filtered water container comprising:

a detection sensor extended along a length of the filtered water container, the detection sensor comprising a plurality of electrode pairs, each respective electrode pair in the plurality of electrode pairs comprising a first electrode and a second electrode spaced sufficiently far apart from each other in the respective electrode pair so that an electrical property associated with the first and second electrodes that changes with changes in the water level can be detected;

a detection circuit in electrical communication with the plurality of electrode pairs in the detection sensor, the detection circuit capable of generating signals based on the respective electrical properties of the first and second electrodes in the plurality of electrode pairs; and a control unit in electrical communication with the detection circuit, wherein the control unit determines changes in the water level in said filtered water container from the signals received from the detection circuit and thereby determines the amount of water added to and/or consumed from said filtered water container over a period of time in which water is added to and consumed from the container.

17. The system of claim 16 wherein the electrical property associated with one or more of said first and second electrodes in the plurality of electrode pairs is one or more of:

a resistance across said first electrode and said second electrode, a capacitance between said first electrode and said second electrode, a voltage across said first electrode and said second electrode, and a current across said first electrode and said second electrode.

18. The system of claim 16 wherein said plurality of electrode pairs comprises between 2 electrode pairs and 10 electrode pairs.

19. The system of claim 16 wherein said plurality of electrode pairs comprises more than 10 electrode pairs.

20. The system of claim 16 further comprising a first lead (a), a second lead (b) and a third lead (c), wherein said first lead (a) is in electrical communication with said first electrode of one of the electrode pairs in said plurality of electrodes;

said second lead (b) is in electrical communication with said second electrode of the one electrode pair in said plurality of electrodes; and said third lead (c) and said second lead (b) are in electrical communication across a resistor; and wherein said control unit
sets said third lead (c) to one of a high or low voltage and said first lead to the other of the high or low voltage, thereby producing a high voltage on second lead (b), and
reverses the voltage states of the first and third leads each time a voltage drop is detected at said second lead (b).

21. The system of claim 20 wherein said control unit switches to a low power consumption idle state when said second lead (b) is in a high voltage state.

22. The system of claim 20 wherein said control unit switches to a high power consumption state when said second lead (b) drops from a high voltage state to a low voltage state.

23. The system of claim 16, further comprising a switch that is in electrical communication with said control unit wherein,
when said switch is in a first state, said control unit determines that said filtered water container is in a nonfunctional state, and
when said switch is in a second state, said control unit determines that said filtered water container is in a functional state, and wherein
said control unit determines changes in water level occurring when said filtered water container is in said functional state, and
said control unit does not determine changes in water level occurring when said filtered water container is in said nonfunctional state.

24. The system of claim 23 wherein said switch is toggled between said first state and said second state by a user.

25. The system of claim 23 wherein said switch is positioned within said filtered water container so that
said switch is in said first state when a lid of the filtered water container is open, and
said switch is in said second state when said lid is closed.

26. The system of claim 23 wherein
said switch is a bubble level switch that comprises a first bubble sensor electrode and a second bubble sensor electrode in an enclosure trapping (i) a fluid and (ii) a bubble; wherein
said bubble sensor electrode is in said first state when said bubble contacts one of said first bubble sensor electrode and said second bubble sensor electrode; and
said bubble sensor electrode is in said second state when said bubble does not contact said first bubble sensor electrode or said second bubble sensor electrode.

27. The system of claim 16 wherein:
said control unit determines that said filtered water container is in a functional state when a rate of change in a water level in said filtered water tank is below a predetermined rate;
said control unit determines that said filtered water container is in a nonfunctional state when a rate of change in a water level in said filtered water tank is above a predetermined rate;
said control unit determines changes in water level occurring when said filtered water container is in said functional state, and
said control unit does not determine changes in water level occurring when said filtered water container is in said nonfunctional state.

28. The system of claim 23 wherein the filtered water container is fitted with a hopper that holds unfiltered water and wherein the hopper is fitted at its base with a replaceable filter cartridge so that water is filtered by draining through the filter cartridge into a lower portion of the water filter container; and
wherein said switch is positioned within said filtered water container so that
said switch is in said first state when the hopper is removed from said filtered water container, and
said switch is in said second state when the hopper is fitted within said filtered water container.

29. The system of claim 16 wherein the filtered water container is fitted with a hopper that holds unfiltered water and wherein the hopper is fitted at its base with a replaceable filter cartridge so that water is filtered by draining through the filter cartridge into a lower portion of the water filter container.

30. The system of claim 16, further comprising a display in electrical communication with said control unit, wherein the control unit is capable of causing the display to display information derived from changes in the current water level.

31. The system of claim 16, further comprising a display in electrical communication with said control unit, wherein the control unit is capable of causing the display to display one or more of a water level of said filtered water level container, a status of a water filter that is disposed within said filtered water container, a determination of whether said filtered water container is in a functional state, a determination of whether said filtered water container is in a nonfunctional state, a time elapsed or an amount of filtered water consumed since a last filter cartridge change, a current time, a warning of overfilling, and a reminder to refill.

32. The system of claim 16 further comprising one or more additional detection sensors, each extending along a length of the filtered water container, and wherein each additional detection sensor comprises a plurality of electrode pairs, each electrode pair in the plurality of electrode pairs comprising a first electrode and a second electrode, each in electrical communication with said detection circuit.

33. The system of claim 32 wherein the control unit determines changes in the filtered water level based on the electrical properties associated with at least two electrode pairs.

34. The system of claim 16 wherein a single common electrode represents the first electrode in each electrode pair in said plurality of electrode pairs.

35. The system of claim 16 wherein each second electrode in all or a portion of the plurality of electrode pairs has a unique length.

36. The system of claim 16 wherein
a single common electrode represents the first electrode in each electrode pair in said plurality of electrode pairs,
each second electrode in all or a portion of the plurality of electrode pairs has a unique length; and
a length of each second electrode in all or a portion of the plurality of electrode pairs is used by said control unit to determine a water level in the filtered water container.

37. The system of claim 16 wherein a length of all or a portion of the electrode pairs in the plurality of electrode pairs is different, and
a length of each electrode pair in all or a portion of the plurality of electrode pairs is used by said control unit to determine a water level in the filtered water container.

38. A method of measuring changes in a water level in a filtered water container comprising the steps of:

generating a signal based on an electrical property associated with a first electrode and a second electrode in an electrode pair, said electrical property changing with changes in the water level in said filtered water container; and determining changes in the water level in said filtered water container from the generated signals; and determining an amount of filtered water consumption from the changes in the water level over a period of time in which water is added to and consumed from the container.

39. The method of claim 38 wherein the electrical property associated with said first electrode and said second electrode is one or more of:

a resistance across said first electrode and said second electrode, a change in a capacitance between said first electrode and said second electrode, a voltage across said first electrode and said second electrode, and a current across said first electrode and said second electrode.

40. The method of claim 38, the method further comprising the step of determining a status of a water filter in said filtered water container based on the changes in the water level.

41. The method of claim 38, wherein the step of generating generates signals from a plurality of electrode pairs and wherein a first lead is in electrical communication with said first electrode of one of the electrode pairs in said plurality of electrode pairs; a second lead is in electrical communication with said second electrode of the one electrode pair in said plurality of electrode pairs; and a third lead and the second lead are in electrical communication across a resistor; and further comprising the steps of:

setting the third lead to one of a high or low voltage and said first lead to the other of the high or low voltage, thereby producing a high voltage on the second lead; and reversing the voltage states of the first and third lead each time a voltage drop is detected at said second lead.

42. A method of measuring a water level of a filtered water container comprising:

generating signals based on electrical properties of a plurality of electrode pairs, the electrical property of each electrode pair in the plurality of electrode pairs changing with changes in the water level in said filtered water container; and determining changes in the water level in said filtered water container from the generated signals; and determining an amount of filtered water consumption from the changes in the water level over a period of time in which water is added to and consumed from the container.

43. The method of claim 42 wherein the electrical property associated with said first electrode and said second electrode is one or more of:

a resistance across said first electrode and said second electrode, a change in a capacitance between said first electrode and said second electrode, a voltage across said first electrode and said second electrode, and a current across said first electrode and said second electrode.

44. The method of claim 42, the method further comprising the step of:

determining a status of a water filter in said filtered water container based on the changes in the water level.

* * * * *